(12) United States Patent
Cheng et al.

(10) Patent No.: US 11,939,688 B2
(45) Date of Patent: Mar. 26, 2024

(54) APPARATUS AND SYSTEMS FOR INCORPORATING EFFECTIVE TRANSPARENT CATALYST FOR PHOTOELECTROCHEMICAL APPLICATION

(71) Applicant: California Institute of Technology, Pasadena, CA (US)

(72) Inventors: Wen-Hui Cheng, Pasadena, CA (US); Harry A. Atwater, South Pasadena, CA (US); Rebecca Saive, Pasadena, CA (US); Matthias H. Richter, Pasadena, CA (US); Sisir Yalamanchili, Milpitas, CA (US); Michael D. Kelzenberg, Glendale, CA (US); Kelly McKenzie, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/835,155

(22) Filed: Mar. 30, 2020

(65) Prior Publication Data

US 2020/0308717 A1 Oct. 1, 2020

Related U.S. Application Data

(60) Provisional application No. 62/826,518, filed on Mar. 29, 2019.

(51) Int. Cl.
 *C25B 9/17* (2021.01)
 *C25B 1/55* (2021.01)
(52) U.S. Cl.
 CPC .............. *C25B 9/17* (2021.01); *C25B 1/55* (2021.01)

(58) Field of Classification Search
 CPC .. C25B 1/55; C25B 9/17; C25B 11/02; C25B 11/049
 See application file for complete search history.

(56) References Cited

U.S. PATENT DOCUMENTS

| 3,278,811 | A | 10/1966 | Hiroshi |
| 4,621,898 | A | 11/1986 | Cohen |

(Continued)

FOREIGN PATENT DOCUMENTS

| CN | 101598717 A | 12/2009 |
| CN | 203812889 U | 9/2014 |

(Continued)

OTHER PUBLICATIONS

International Preliminary Report on Patentability for International Application PCT/IB2018/056249, Report dated Feb. 18, 2020, dated Feb. 27, 2020, 8 pgs.

(Continued)

*Primary Examiner* — Ciel P Contreras

(57) ABSTRACT

Photoelectrochemical (PEC) technology for the conversion of solar energy into chemicals may require cost-effective photoelectrodes to efficiently and stably drive anodic and/or cathodic half-reactions to complete the overall reactions for storing solar energy in chemical bonds. Apparatus and systems incorporating effectively transparent metal catalysts enable the design and/or implementation of PEC devices for light harvesting. Triple-junction photocathodes with the triangular catalyst grids are provided to improve the efficiency of the photocathodes to generate renewable fuel from sunlight.

11 Claims, 13 Drawing Sheets

(56) References Cited

U.S. PATENT DOCUMENTS

| | | |
|---|---|---|
| 4,771,017 A | 9/1988 | Tobin et al. |
| 5,075,262 A | 12/1991 | Nguyen et al. |
| 5,076,857 A | 12/1991 | Nowlan |
| 5,122,215 A | 6/1992 | Shibata et al. |
| 5,554,229 A | 9/1996 | Vogeli |
| 5,951,786 A | 9/1999 | Gee et al. |
| 6,473,220 B1 | 10/2002 | Clikeman et al. |
| 6,573,445 B1 | 6/2003 | Burgers |
| 6,768,048 B2 | 7/2004 | Woll et al. |
| 7,573,550 B2 | 8/2009 | Lubart et al. |
| 7,595,934 B2 | 9/2009 | Lubart et al. |
| 8,202,566 B2 | 6/2012 | Davidson et al. |
| 8,648,248 B2 | 2/2014 | Rodriguez-Parada et al. |
| 9,750,141 B2 | 8/2017 | Noy |
| 10,026,560 B2 | 7/2018 | Lewis et al. |
| 10,036,093 B2 | 7/2018 | Chueh et al. |
| 10,062,520 B2 | 8/2018 | Kitagawa et al. |
| 10,119,197 B2 | 11/2018 | Alibabaei et al. |
| 10,202,695 B2 | 2/2019 | Schwartz |
| 10,242,806 B2 | 3/2019 | Lewis et al. |
| 10,700,234 B2 | 6/2020 | Saive et al. |
| 11,041,338 B2 | 6/2021 | Saive et al. |
| 2003/0041894 A1 | 3/2003 | Sverdrup, Jr. et al. |
| 2005/0109388 A1 | 5/2005 | Murakami et al. |
| 2006/0139725 A1 | 6/2006 | Kai et al. |
| 2006/0283498 A1 | 12/2006 | Gronet |
| 2007/0281099 A1 | 12/2007 | Howarth et al. |
| 2008/0176030 A1 | 7/2008 | Fonash et al. |
| 2008/0271776 A1 | 11/2008 | Morgan |
| 2009/0061213 A1 | 3/2009 | Bahnmuller et al. |
| 2009/0078303 A1 | 3/2009 | Brezoczky et al. |
| 2009/0221111 A1 | 9/2009 | Frolov et al. |
| 2009/0229667 A1 | 9/2009 | Shrotriya et al. |
| 2009/0255568 A1 | 10/2009 | Morgan |
| 2010/0075261 A1 | 3/2010 | Clevenger et al. |
| 2010/0079845 A1 | 4/2010 | Wang et al. |
| 2010/0089262 A1 | 4/2010 | Seong et al. |
| 2010/0116316 A1 | 5/2010 | Moslehi et al. |
| 2010/0283069 A1 | 11/2010 | Rogers et al. |
| 2011/0120527 A1 | 5/2011 | Huang et al. |
| 2012/0067400 A1 | 3/2012 | Derryberry et al. |
| 2012/0067402 A1 | 3/2012 | Kitai et al. |
| 2012/0154921 A1 | 6/2012 | Yoshida et al. |
| 2012/0229907 A1 | 9/2012 | Ueda et al. |
| 2013/0026593 A1 | 1/2013 | Hermans et al. |
| 2013/0074918 A1 | 3/2013 | Jeong et al. |
| 2013/0125974 A1 | 5/2013 | Kong et al. |
| 2013/0210185 A1 | 8/2013 | Yoshimi et al. |
| 2013/0306965 A1 | 11/2013 | Ahn et al. |
| 2014/0000692 A1 | 1/2014 | Fogel et al. |
| 2014/0029104 A1 | 1/2014 | Guo et al. |
| 2014/0130864 A1 | 5/2014 | Lunt et al. |
| 2014/0182656 A1 | 7/2014 | Bodan et al. |
| 2014/0283896 A1 | 9/2014 | Lunt, III et al. |
| 2015/0200320 A1 | 7/2015 | Martorell et al. |
| 2015/0311370 A1 | 10/2015 | Chou et al. |
| 2016/0041656 A1 | 2/2016 | Bita et al. |
| 2016/0087135 A1 | 3/2016 | Horimai et al. |
| 2016/0087233 A1 | 3/2016 | Guha et al. |
| 2016/0302305 A1 | 10/2016 | Chang et al. |
| 2016/0313640 A1 | 10/2016 | Cok et al. |
| 2016/0322514 A1 | 11/2016 | Atwater et al. |
| 2016/0372271 A1* | 12/2016 | Kitagawa ................. C25D 5/54 |
| 2017/0038047 A1 | 2/2017 | Golle et al. |
| 2017/0179041 A1 | 6/2017 | Dias et al. |
| 2017/0263796 A1 | 9/2017 | Jahelka |
| 2018/0088431 A1 | 3/2018 | Holt et al. |
| 2018/0248064 A1 | 8/2018 | Lunt et al. |
| 2019/0067504 A1 | 2/2019 | Needell et al. |
| 2019/0074401 A1 | 3/2019 | Saive et al. |
| 2019/0148574 A1 | 5/2019 | Saive et al. |
| 2019/0312168 A1 | 10/2019 | Jahelka et al. |
| 2019/0326460 A1 | 10/2019 | Needell et al. |
| 2020/0028005 A1 | 1/2020 | Saive et al. |
| 2020/0063487 A1 | 2/2020 | Saive et al. |
| 2020/0152821 A1 | 5/2020 | Saive et al. |
| 2020/0241186 A1 | 7/2020 | Ohta et al. |

FOREIGN PATENT DOCUMENTS

| | | |
|---|---|---|
| DE | 112018004186 T5 | 5/2020 |
| DE | 112018004186 T8 | 7/2020 |
| EP | 2444844 A2 | 4/2012 |
| JP | 2010219173 A | 9/2010 |
| JP | 2012094855 A | 5/2012 |
| KR | 20120053720 A | 5/2012 |
| KR | 1020200040798 A | 4/2020 |
| WO | 2016111576 A1 | 7/2016 |
| WO | 2019035094 A1 | 2/2019 |
| WO | 2019099733 A1 | 5/2019 |
| WO | 2019133996 A1 | 7/2019 |
| WO | 2019204809 A1 | 10/2019 |
| WO | 2020041522 A1 | 2/2020 |
| WO | 2020205800 A1 | 10/2020 |

OTHER PUBLICATIONS

International Preliminary Report on Patentability for International Application No. PCT/US2019/012916, Report dated Jul. 14, 2020, dated Jul. 23, 2020, 7 Pgs.

International Preliminary Report on Patentability for International Application PCT/US2018/061373, Report dated May 19, 2020, dated May 28, 2020, 8 pages.

International Search Report and Written Opinion for International Application No. PCT/US2019/012916, Search completed May 3, 2019, dated May 7, 2019, 10 pgs.

International Search Report and Written Opinion for International Application No. PCT/IB2018/056249, Search completed Nov. 8, 2018, dated Dec. 20, 2018, 14 pgs.

International Search Report and Written Opinion for International Application No. PCT/US2019/028522, Search completed Sep. 4, 2019, dated Sep. 4, 2019, 8 pgs.

International Search Report and Written Opinion for International Application No. PCT/US2019/047576, Search completed Oct. 22, 2019, dated Nov. 8, 2019, 15 pgs.

International Search Report and Written Opinion for International Application No. PCT/US2020/025834, completed Jul. 16, 2020, dated Jul. 17, 2020, 7 pgs.

International Search Report and Written Opinion for International Application No. PCT/US2018/061373, Search completed Mar. 6, 2019, dated Mar. 7, 2019, 10 pgs.

"LCR-XPTM Data Sheet", Ulbrich Solar Technologies, Retrieved from: https://www.pvribbon.com/technology/lcr-xp-data-sheet/, 3 pgs.

Aberg et al., "A GaAs Nanowire Array Solar Cell With 15.3% Efficiency at 1 Sun", IEEE Journal of Photovoltaics, Oct. 14, 2015, vol. 6, No. 1, doi: 10.1109/JPHOTOV.2015.2484967, pp. 185-190.

Adams et al., "Are global wind power resource estimates overstated?", Environmental Research Letters, Feb. 25, 2013, vol. 8, No. 1, 15021, doi: 10.1088/1748-9326/8/1/015021.

Afshinmanesh et al., "Transparent metallic fractal electrodes for semiconductor devices", Nano letters, Aug. 20, 2014, vol. 14, pp. 5068-5074.

Andrews et al., "The Effect of Spectral Albedo on Amorphous Silicon and Crystalline Silicon Solar Photovoltaic Device Performance", Solar Energy, vol. 91, Mar. 22, 2013, pp. 233-241.

Arora et al., "Perovskite solar cells with CuSCN hole extraction layers yield stabilized efficiencies greater than 20%", Science, Nov. 10, 2017, vol. 358, No. 6364, pp. 768-771, doi: 10.1126/science.aam5655.

Arvo, "Backward ray tracing", Developments in Ray Tracing, Computer Graphics, Proc. of ACM SIGGRAPH 86 Course Notes, 1986, pp. 259-263.

Baruch et al., "On some thermodynamic aspects of photovoltaic solar energy conversion", Solar Energy Materials and Solar Cells, vol. 36, No. 2, Feb. 1995, pp. 201-222.

Batchelder et al., "The Luminescent Solar Concentrator", Thesis, California Institute of Technology, 1982, 287 pgs.

(56) References Cited

OTHER PUBLICATIONS

Blakers, "Shading losses of solar-cell metal grids", Journal of Applied Physics, May 15, 1992, vol. 71, No. 10, pp. 5237-5241, published online Jun. 4, 1998.
Bomm et al., "Fabrication and spectroscopic studies on highly luminescent CdSe/CdS nanorod polymer composites", Beilstein Journal of Nanotechnology, vol. 1, No. 1, Nov. 29, 2010, pp. 94-100.
Brennan et al., "Effects of Spectral Albedo on Solar Photovoltaic Devices", Solar Energy Materials and Solar Cells, vol. 124, Feb. 19, 2014, pp. 111-116.
Bronstein et al., "Luminescent Solar Concentration with Semiconductor Nanorods and Transfer-Printed Micro-Silicon Solar Cells", ACS Nano, vol. 8, No. 1, Jan. 28, 2014, pp. 44-53.
Bronstein et al., "Quantum Dot Luminescent Concentrator Cavity Exhibiting 30-fold Concentration", ACS Phototonics, vol. 2, No. 11, Aug. 17, 2015, pp. 1576-1583.
Burgers, "How to Design Optimal Metallization Patterns for Solar Cells", Progress in Photovoltaics: Research and Applications, May 4, 1999, vol. 7, pp. 457-461, http://www.ecn.nl/docs/library/report/1999/rx99023.pdf.
Carlson et al., "Transfer printing techniques for materials assembly and micro/nanodevice fabrication", Advanced Materials, vol. 24, No. 39, Oct. 9, 2012, Electronic Publication: Aug. 31, 2012, pp. 5284-5318.
Chen et al., "Compact high-quality CdSe—CdS core-shell nanocrystals with narrow emission linewidths and suppressed blinking", Nature Materials, vol. 12, No. 5, May 2013, Electronic Publication: Feb. 3, 2013, pp. 445-451.
Chen et al., "Increasing light capture in silicon solar cells with encapsulants incorporating air prisms to reduce metallic contact losses", Optics Express, vol. 24, No. 22, Oct. 31, 2016, published Sep. 30, 2016, 12 pgs.
Cheng et al., "Monolithic Photoelectrochemical Device for Direct Water Splitting with 19% Efficiency", ACS Energy Letters, vol. 3, No. 8, Jun. 25, 2018, pp. 1795-1800.
Coropceanu et al., "Core/shell quantum dot based luminescent solar concentrators with reduced reabsorption and enhanced efficiency", Nano Letters, vol. 14, No. 7, Jul. 9, 2014, Electronic Publication: Jun. 6, 2014, pp. 4097-4101.
Cuevas et al., "50 Per cent more output power from an albedo-collecting flat panel using bifacial solar cells", Solar Energy, vol. 29, No. 5, 1982, pp. 419-420.
De Souza et al., "Inversion mode n-channel GaAs field effect transistor with high-k/metal gate", Applied Physics Letters, Apr. 16, 2008, vol. 92, No. 15, pp. 153508-1-153508-2, https://doi.org/10.1063/1.2912027.
Debije et al., "Thirty Years of Luminescent Solar Concentrator Research: Solar Energy for the Built Environment", Advanced Energy Materials, vol. 2, No. 1, 2012, pp. 12-35.
Deline et al., "Evaluation and Field Assessment of Bifacial Photovoltaic Module Power Rating Methodologies", IEEE 43rd Photovoltaic Specialists Conference (PVSC), Portland, Oregon, Jun. 5-10, 2016, 6 pgs.
Divitt et al., "Spatial coherence of sunlight and its implications for light management in photovoltaics", Optica, Jan. 27, 2015, vol. 2, No. 2, pp. 95-103, doi: 10.1364/OPTICA.2.000095.
Ellmer, "Past achievements and future challenges in the development of optically transparent electrodes", Nature Photonics, Nov. 30, 2012, vol. 6, pp. 809-817.
Essig et al., "Mechanically stacked 4-terminal III-V/Si tandem solar cells", Conference paper, Jun. 2017, 2 pgs.
Essig et al., "Realization of GaInP/Si dual-junction solar cells with 29.8% one-sun efficiency", IEEE Journal of Photovoltaics, vol. 6, No. 4, Jul. 2016, Date of Publication: Apr. 27, 2016, 7 pgs.
Feldmann et al., "Carrier-selective contacts for Si solar cells", Applied Physics Letters, vol. 104, No. 18, May 8, 2014, pp. 181105-1-181105-4.
Ferry et al., "Light trapping in ultrathin plasmonic solar cells", Optics Express, Jun. 24, 2010, vol. 18, pp. A237-A245.
Fertig et al., "Bifacial potential of single- and double-sided collecting silicon solar cells", Progress in Photovoltaics: Research and Applications, vol. 24, No. 6, Jan. 13, 2016, pp. 818-829.
Fertig et al., "Economic feasibility of bifacial silicon solar cells", Progress in Photovoltaics: Research and Applications, vol. 24, No. 6, Jan. 14, 2016, pp. 800-817.
Fraunhofer, "Photovoltaics Report", Fraunhofer ISE, Freiburg, 2014, 44 pgs.
Gallagher et al., "Quantum dot solar concentrator behaviour, predicted using a ray trace approach", International Journal of Ambient Energy, vol. 25, No. 1, Jan. 2004, pp. 47-56.
Gangopadhyay et al., "Front Grid Design For Plated Contact Solar Cells", IEEE, 399-402, 2002.
Geisz et al., "Enhanced external radiative efficiency for 20.8% efficient single-junction GaInP solar cells", Applied Physical Letters, vol. 103, No. 4, Jul. 25, 2013, pp. 041118-1-041118-5.
"Fraunhofer Photovoltaics Report", Fraunhofer Institute for Solar Energy Systems, ISE, Jul. 12, 2017, 44 pgs.
Arai et al., "A monolithic device for $CO_2$ photoreduction to generate liquid organic substances in a single-compartment reactor", Energy & Environmental Science, 2015, vol. 8, pp. 1898-2002, DOI: 10.1039/c5ee01314c.
Choi et al., "Sn-Coupled p-Si Nanowire Arrays for Solar Formate Production from $CO_2$", Advanced Energy Materials, 2014, vol. 4, No. 11, 1301614, 8pts., https://doi.org/10.1002/aenm.201301614.
Cotal et al., "III-V multijunction solar cells for concentrating photovoltaics", Energy & Environmental Science, 2009, vol. 2, pp. 174-192, first published as an Advance Article on the web Dec. 10, 2008, DOI: 10.1039/b809257e.
Gurudayal et al., "Efficient solar-driven electrochemical $CO_2$ reduction to hydrocarbons and oxygenates", Energy & Environmental Science, Aug. 31, 2017, vol. 10, pp. 2222-2230, https://doi.org/10.1039/C7EE01764B.
Gurudayal et al., "Si photocathode with Ag-supported dendritic Cu catalyst for $CO_2$ reduction", Energy & Environmental Science, 2019, vol. 12, pp. 1068-1077, doi: 10.1039/c8ee03547d.
Kong et al., "Directed Assembly of Nanoparticle Catalysts on Nanowire Photoelectrodes for Photoelectrochemical $CO_2$ Reduction", Nano Letters, Sep. 14, 2016, vol. 16, No. 9, pp. 5675-5680, published online Aug. 5, 2016, doi: 10.1021/acs.nanolett.6b02321.
Law et al., "Recent progress of Spectrolab high-efficiency space solar cells", 38th IEEE Photovoltaic Specialists Conference, Nov. 6, 3023, pp. 3146-3149, DOI:10.1109/PVSC.2012.6318246.
Mittag et al., "Triangular Ribbons for Improved Module Efficiency", presented at the 32nd European PV Solar Energy Conference and Exhibition, Jun. 20-24, 2016, Munich. Germany, 4 pgs.
Saive et al., "Enhancing the Power Output of Bifacial Solar Modules by Applying Effectively Transparent Contacts (ETCs) With Light Trapping", IEEE Journal of Photovoltaics, 2018, 7 pgs., DOI: 10.1109/JPHOTOV.2018.2844850.
Song et al., "Nanoporous Au Thin Films on Si Photoelectrodes for Selective and Efficient Photoelectrochemical $CO_2$ Reduction", Advanced Energy Materials, Mar. 2017, vol. 7, No. 3, No. 1, 9 pgs., first published Feb. 8, 2017, DOI: 10.1002/aenm.201601103.
Walter et al., "Solar Water Splitting Cells", Chemical Reviews, 2010, vol. 110, pp. 6446-6473, DOI: 10.1021/cr1002326.
Zhou et al., "Solar-Driven Reduction of 1 atm of $CO_2$ to Formate at 10% Energy-Conversion Efficiency by Use of a $TiO_2$-Protected III-V Tandem Photoanode in Conjunction with a Bipolar Membrane and a Pd/C Cathode", ACS Energy Letters, Sep. 9, 2016, vol. 1, No. 4, pp. 764-770, https://doi.org/10.1021/acsenergylett.6b00317.
Rodriguez, "Bifacial solar cells—the two sides of the story", Solar Choice News, New Technologies May 5, 2015, Retrieved from: https://www.solarchoice.net.au/blog/news/bifacial-solar-cells-the-two-sides-of-the-story-050515, 7 pgs.
Römer et al., "Ion Implantation for Poly-Si Passivated Back-Junction Back-Contacted Solar Cells", IEEE Journal of Photovoltaics, vol. 5, No. 2, Mar. 2015, pp. 507-514.
Rowan et al., "Advanced Material Concepts for Luminescent Solar Concentrators", IEEE Journal of Selected Topics in Quantum Electronics, vol. 14, No. 5, Nov. 2008, pp. 1312-1322.

(56) References Cited

OTHER PUBLICATIONS

Rowell et al., "Transparent electrode requirements for thin film solar cell modules", Energy & Environmental Science, 2011, vol. 4, pp. 131-134.
Russell et al., "The Influence of Spectral Albedo on Bifacial Solar Cells: A Theoretical and Experimental Study", IEEE Journal of Photovoltaics, vol. 7, No. 6, Nov. 2017, pp. 1611-1618.
Sahin et al., "Monte-Carlo simulation of light propagation in luminescent solar concentrators based on semiconductor nanoparticles", Journal of Applied Physics, vol. 110, No. 3, Aug. 11, 2011, pp. 03108-1-033108-8.
Saive et al, "Effectively transparent contacts (ETCs) for solar cells", Photovoltaic Specialists Conference (PVSC), 2016 IEEE 43rd, 2016, pp. 3612-3615: IEEE.
Saive et al, "Effectively transparent front contacts for optoelectronic devices", Advanced Optical Materials, Jun. 10, 2016, vol. 4, No. 10, pp. 1470-1474, doi: 10.1002/adom.201600252.
Saive et al, "Enhancing the Power Output of Bifacial Solar Modules by Applying Effectively Transparent Contacts (ETCs) With Light Trapping", IEEE Journal of Photovoltaics, Sep. 2018, vol. 8, No. 5, pp. 1183-1189.
Saive et al, "Silicon heterojunction solar cells with effectively transparent front contacts", Sustainable Energy & Fuels, 2017, vol. 1, pp. 593-598.
Saive et al., "Effectively Transparent Front Contacts for Optoelectronic Devices", Advanced Optical Materials, 2016, 5 pgs.
Saive et al., "Enhanced Light Trapping in Thin Silicon Solar Cells using Effectively Transparent Contacts (ETCs)", 44th IEEE Photovoltaic Specialist Conferences, Aug. 2017, 5 pgs.
Saive et al., "Light Trapping in Bifacial Solar Modules Using Effectively Transparent Contacts (ETCs)", 45th IEEE Photovoltaic Specialist Conference, Aug. 2018, 3 pgs.
Saive et al., "Mesoscale trumps nanoscale: metallic mesoscale contact morphology for improved light trapping, optical absorption and grid conductance in silicon solar cells", Optics Express, Mar. 6, 2018, vol. 26, No. 6, pp. A275-A282, doi: 10.1364/OE.26.00A275.
Saive et al., "Three-dimensional nanoimprint lithography using two-photon lithography master samples", arXiv preprint arXiv:1702.04012v1, 2017.
Saive et al., "Transparent, Conductive and Lightweight Superstrates for Perovskite Solar Cells and Modules", 45th IEEE Photovoltaic Specialist Conference, Aug. 2018, 5 pgs.
Sanyo Energy Corp, "Bifacial Photovoltaic Module", Hit photovoltaic module double, Jan. 9, 2008, 2 pgs.
Sark et al., "Luminescent Solar Concentrators: The route to 10% efficiency", IEEE Photovoltaic Specialist Conference, Jun. 8-13, 2014, pp. 2276-2278.
Schneider et al., "Solar Cell Efficiency Improvement by New Metallization Techniques—the Day4 Electrode Concept", Proceedings of the IEEE 4th World Conference on Photovoltaic Energy Conference, Waikoloa, Hawaii, May 7-12, 2006.
Sheldon et al., "Evaluation of ITO/GaAs solar cells", Journal of Vacuum Science and Technology, 1982, vol. 20, No. 3, pp. 410-413, doi: 10.1116/1.571479.
Shockley et al., "Detailed Balance Limit of Efficiency of p-n Junction Solar Cells", Journal of Applied Physics, vol. 32, No. 3, Mar. 1961, pp. 510-519.
Sholin et al., "Semiconducting polymers and quantum dots in luminescent solar concentrators for solar energy harvesting", Journal of Applied Physics, vol. 101, No. 12, Jun. 28, 2007, pp. 123114-1-123114-9.
Slooff et al., "A Luminescent Solar Concentrator with 7.1% power conversion efficiency", Phys. Status Solid—Rapid Res. Letter, vol. 2, No. 6, 2008, pp. 257-259, published online Sep. 6, 2008.
Soderstrom et al., "Smart Wire Connection Technology", 28th European Photovoltaic Solar Energy Conference and Exhibition, Session 1CV.2.17, 2013, pp. 495-499.
Soderstrom et al., "Smart Wire Connection Technology", Meyer Burger, Retrieved from: https://www.meyerburger.com/user_upload/dashboard_news_bundle/376409e022f7d2ae6f6e29318f8055410774c7fd.pdf, 12 pgs.
Soria et al., "A study of the annual performance of bifacial photovoltaic modules in the case of vertical facade integration", Energy Science & Engineering, vol. 4, No. 1, Nov. 26, 2015, pp. 52-68.
Sze et al., "Physics of semiconductor devices", Hoboken, NJ, Wiley-Interscience, 2007, 763 pgs. (presented in three parts).
Taguchi et al., "24.7% record efficiency HIT solar cell on thin silicon wafer", IEEE Journal of Photovoltaics, Jan. 2014, vol. 4, pp. 96-99.
Unknown Author, "Bright Green Tree—Waikato", https://commons.wikimedia.org/wiki/File:Bright_green_tree_-_Waikato.jpg, 2005.
Valdivia et al., "Bifacial Photovoltaic Module Energy Yield Calculation and Analysis", IEEE PVSC 2017 Conference Proceedings, 2017, pp. 1094-1099.
Van Dam et al., "High-Efficiency Nanowire Solar Cells with Omnidirectionally Enhanced Absorption Due to Self-Aligned Indium-Tin-Oxide Mie Scatterers", ACS Nano, Nov. 29, 2016, vol. 10, No. 12, pp. 11414-11419, doi: 10.1021/acsnano.6b06874.
Van De Groep et al., "Transparent Conducting Silver Nanowire Networks", Nano Letters, May 3, 2012, vol. 12, pp. 3138-3144, doi: 10.1021/nl301045a.
Vest et al., "Levelized Cost and Levelized Avoided Cost of New Generation Resources in the Annual Energy Outlook 2016", U.S. Energy Information Administration, Aug. 2016, 20 pgs.
Vogt, "Development of Physical Models for the Simulation of Optical Properties of Solar Cell Modules", Hannover, Leibniz Information Centre For Science and Technology University Library, Thesis, 2015, 161 pgs.
Vogt et al., "Measurement of the Optical Constants of Soda-Lime Glasses in Dependence of Iron Content and Modeling of Iron-Related Power Losses in Crystalline Si Solar Cell Modules", IEEE Journal of Photovoltaics, vol. 6, No. 1, Nov. 19, 2015, pp. 111-118.
Vogt et al., "Optical Constants of UV Transparent EVA and the Impact on the PV Module Output Power under Realistic Irradiation", Energy Procedia, vol. 92, Aug. 2016, pp. 523-530.
Wallentin et al., "InP Nanowire Array Solar Cells Achieving 13.8% Efficiency by Exceeding the Ray Optics Limit", Science, Mar. 1, 2013, vol. 339, No. 6123, pp. 1057-1060, doi: 10.1126/science.1230969.
Wang et al, "Image quality assessment: from error visibility to structural similarity", IEEE transactions on image processing, Apr. 2004, vol. 13, No. 4, pp. 600-612.
Ward et al., "High aspect ratio electrodeposited Ni/Au contacts for GaAs-based III-V concentrator solar cells", Progress in Photovoltaics: Research and Applications, No. 23, 2015, Published online Mar. 20, 2014, pp. 646-653.
Wheeler et al., "Switchable Photovoltaic Windows Enabled by Reversible Photothermal Complex Dissociate from Methylammonium Lead Iodide", Nature Communications, vol. 8, No. 1722, 2017, pp. 1-9.
Wittwer et al., "Fluorescent Planar Concentrators", Solar Energy Materials and Solar Cells, vol. 11, No. 3, 1984, pp. 187-197.
Woodhouse et al., "A Manufacturing Cost Analysis Relevant to Single- and Dual-Junction Photovoltaic Cells Fabricated with III-Vs and III-Vs Grown on Czochralski Silicon", National Renewable Energy Lab, Sep. 30, 2013, 92 pgs.
Wurfel et al., "Charge Carrier Separation in Solar Cells", IEEE Journal of Photovoltaics, Nov. 20, 2014, vol. 5, No. 1, pp. 461-469, doi: 10.1109/JPHOTOV.2014.2363550.
Xie et al., "InAs/InP/ZnSe core.shell/shell quantum dots as near-infrared emitters: Bright, narrow-band, non-cadium containing, and biocompatible", Nano Research, vol. 1, No. 6, 2008, pp. 457-464.
Yablonovitch, "Statistical ray optics", Journal of the Optical Society of America, vol. 72, No. 7, Jul. 1982, pp. 899-907.
Yablonovitch, "Thermodynamics of the fluorescent planar concentrator", Journal of the Optical Society of America, vol. 70, No. 11, Nov. 1980, pp. 1362-1363.
Yin et al., "19.2% Efficient InP Heterojunction Solar Cell with Electron-Selective $TiO_2$ Contact", ACS Photonics, Sep. 25, 2014, vol. 1, No. 12, pp. 1245-1250, doi: 10.1021/ph500153c.

(56) References Cited

OTHER PUBLICATIONS

Yu et al., "Selecting tandem partners for silicon solar cells", Nature Energy, Nov. 2016, vol. 1, No. 11, Article 16137, pp. 1-4, published Sep. 26, 2016, doi: 10.1038/nenergy.2016.137.

Yusufoglu et al., "Analysis of the Annual Performance of Bifacial Modules and Optimization Methods", IEEE Journal of Photovoltaics, vol. 5, No. 1, Nov. 20, 2014, pp. 320-328.

Zheng et al., "Graphene oxide-based transparent conductive films", Progress in Materials Science, Mar. 25, 2014, vol. 64, pp. 200-247.

Zhou et al., "Near Infrared, Highly Efficient Luminescent Solar Concentrators", Advanced Energy Materials, vol. 6, No. 11, Jun. 8, 2016, pp. 1-8.

Goetzberger et al., "Solar Energy Conversion with Fluorescent Collectors", Applied Physics, vol. 14, No. 2, Oct. 1977, pp. 123-129.

Goldschmidt et al., "Increasing the efficiency of fluorescent concentrator systems", Solar Energy Materials and Solar Cells, vol. 93, No. 2, Feb. 2009, pp. 176-182, available online Nov. 20, 2008.

Goncharov et al, "Reconstruction of the optical system of the human eye with reverse ray-tracing", Optics express, Feb. 4, 2008, vol. 16, No. 3, pp. 1692-1703.

Green, "Self-consistent optical parameters of intrinsic silicon at 300 K including temperature coefficients", Solar Energy Materials and Solar Cells, vol. 92, No. 11, Nov. 2008, pp. 1305-1310.

Guerrero-Lemus et al., "Bifacial solar photovoltaics—A technology review", Renewable and Sustainable Energy Reviews, Mar. 8, 2016, vol. 60, pp. 1533-1549.

Guo et al., "Vertically mounted bifacial photovoltaic modules: A global analysis", Energy, vol. 61, Nov. 1, 2013, pp. 447-454, available online Sep. 23, 2013.

Gutmann et al., "Predicting the performance of photonic luminescent solar concentrators", IEEE Photovoltaic Specialists Conference, Jun. 16-21, 2013, pp. 1864-1868.

Hansen et al., "Analysis of Irradiance Models for Bifacial PV Modules", IEEE 43rd Photovoltaic Specialists Conference (PVSC), Portland, Oregon, Jun. 5-10, 2016, 6 pgs.

Henry et al., "Alumina etch masks for fabrication of high-aspect-ratio silicon micropillars and nanopillars", Nanotechnology, Jun. 2, 2009, vol. 20, 255305, 4 pgs.

Henry, "ICP etching of silicon for micro and nanoscale devices", Thesis, California Institute of Technology, May 19, 2010, 219 pgs., (presented in two parts).

Herasimenka et al., "> 750 mV open circuit voltage measured on 50 um thick silicon heterojunction solar cell", Applied Physics Letters, Aug. 1, 2013, vol. 103, pp. 053511-1-053511-4.

Hinkle et al., "Detection of Ga suboxides and their impact on III-V passivation and Fermi-level pinning", Applied Physics Letters, Apr. 20, 2009, vol. 94, No. 16, pp. 162101-1-162101-3, doi: 10.1063/1.3120546.

Holman et al., "Current losses at the front of silicon heterojunction solar cells", IEEE Journal of Photovoltaics, Jan. 2012, vol. 2, No. 1, pp. 7-15.

Honsberg et al., PVCDROM, http://pveducation.org/pvcdrom, Jan. 5, 2015, 1 page.

Horzel et al., "Advantages of a new metallisation structure for the front side of solar cells", 13th European Photovoltaic Solar Energy Conference, Oct. 23-27, 1995, pp. 1368-1373.

Hoye et al., "Strongly Enhanced Photovoltaic Performance and Defect Physics of Air-Stable Bismuth Oxyiodide (BiOI)", Advanced Materials, Jul. 17, 2017, vol. 29, No. 36, 1702176, 10 pgs., doi: 10.1002/adma.201702176.

Hsu et al., "Performance enhancement of metal nanowire transparent conducting electrodes by mesoscale metal wires", Nature Communications, Sep. 25, 2013, vol. 4, No. 2522, pp. 1-7.

Hu et al., "Ray-trace simulation of CuInS(Se)_2 quantum dot based luminescent solar concentrators", Optics Express, vol. 23, No. 15, Jul. 27, 2015, pp. A858-A867.

Huang et al., "Fabrication of Silicon Nanowire Arrays with Controlled Diameter, Length, and Density", Advanced Materials, Feb. 7, 2007, vol. 19, No. 5, pp. 744-748, doi: 10.1002/adma.200600892.

Jasieniak et al., "Re-examination of the Size-Dependent Absorption Properties of CdSe Quantum Dots", Journal of Physical Chemistry, vol. 113, No. 45, Oct. 15, 2009, pp. 19468-19474.

Jiang et al., "Enhanced electron extraction using SnO2 for highefficiency planar-structure HC(NH$_2$)2PbI$_3$-based perovskite solar cells", Nature Energy, Nov. 14, 2016, vol. 2, Issue 16177, 7 pgs., doi: 10.1038/nenergy.2016.177.

Kelzenberg, "Silicon microwire photovoltaics", Thesis, California Institute of Technology, May 19, 2010, 324 pgs., (presented in two parts).

Kik et al., "Catoptric electrodes: transparent metal electrodes using shaped surfaces", Optics Letters, vol. 39, No. 17, Sep. 1, 2014, pp. 5114-5117, http://dx.doi.org/10.1364/OL39.005114.

King, "Photovoltaic Module and Array Performance Characterization Methods for All System Operating Conditions", AIP Conference Proceedings, vol. 394, No. 1, May 12, 2008, 22 pgs.

Klein et al., "Transparent Conductive Adhesives for Tandem Solar Cells Using Polymer—Particle Composites", ACS Applied Materials & Interfaces, 2008, No. 10, pp. 8086-8091.

Kopecek et al., "Bifaciality: One small step for technology, one giant leap for kWh cost reduction", Photovoltaics International, vol. 26, 2014, 11 pgs.

Kreinin et al., "PV systems based on bifacial modules: Performance simulation vs. design factors", IEEE 43rd Photovoltaic Specialists Conference (PVSC), Portland, Oregon, Jun. 5-10, 2016, pp. 2688-2691.

Krenzinger et al., "Estimation of Radiation Incident on Bifacial Albedo-Collecting Panels", International Journal of Solar Energy, vol. 4, No. 5, 1986, pp. 297-319.

Kuang et al., "A New Architecture for Transparent Electrodes: Relieving the Trade-Off Between Electrical Conductivity and Optical Transmittance", Advanced Materials, No. 23, 2011, pp. 2469-2473.

Lai et al., "Schottky Barrier Catalysis Mechanism in Metal-Assisted Chemical Etching of Silicon", ACS Applied Materials & Interfaces, Mar. 28, 2016, vol. 8, No. 14, pp. 8875-8879. doi: 10.1021/acsami.6b01020.

Levy et al., "Rapid and precise calculations of energy and particle flux for detailed-balance photovoltaic applications", Solid-State Electronics, vol. 50, No. 7-8, Jul.-Aug. 2006, pp. 1400-1405.

Lo et al., "New integrated simulation tool for the optimum design of bifacial solar panel with reflectors on a specific site", Renewable Energy, vol. 81, Sep. 2015, pp. 293-307.

Lohmüller et al., "The HIP-MWT+ solar cell concept on n-type silicon and metallization-induced voltage losses", 29th European PV Solar Energy Conference and Exhibition, Amsterdam, The Netherlands, Sep. 22-26, 2014, 7 pgs.

Lossen et al., "Double Printing nPERT Cells with Narrow Contact Layers", Energy Procedia, vol. 92, Aug. 2016, pp. 939-948.

Ma et al., "Enhancement of photovoltaic cell response due to high-refractive-index encapsulants", Journal of Applied Physics, Aug. 18, 2010, vol. 108, pp. 043102-1-043102-3, http://www.ecse.rpiscrews.us/~schubert/Reprints/2010-Ma-Ming-et-al-%28JAP%29-Enhancement-of-photovoltaic-cell-response-due-to-high-refractive-index-encapsulants.pdf.

Madrid et al., "Investigation of the Efficiency Boost Due to Spectral Concentration in a Quantum-Dot Based Luminescent Concentrator", IEEE World Conference on Photovoltaic Energy Conference, May 7-12, 2006, pp. 154-157.

Martinez et al., "Design, fabrication, and characterization of a luminescent solar concentrator with optimized optical concentration through minimization of optical losses", Journal of Photonics for Energy, vol. 6, No. 4, Nov. 30, 2016, pp. 045504-1-045501-11.

Masuko et al., "Achievement of more than 25% conversion efficiency with crystalline silicon heterojunction solar cell", IEEE Journal of Photovoltaics, Nov. 2014, vol. 4, pp. 1433-1435.

McIntosh et al., "OPAL 2: Rapid Optical Simulation of Silicon Solar Cells", 38th IEEE Photovoltaic Specialists Conference, Austin, Texas, Jun. 3-8, 2012, 8 pgs.

Meinardi et al., "Highly efficient luminescent solar concentrators based on earth-abundant indirect-bandgap silicon quantum dots", Nature Photonics, vol. 11, No. 3, Mar. 1, 2017, pp. 177-185.

(56) References Cited

OTHER PUBLICATIONS

Meinardi et al., "Large-area luminescent solar concentrators based on 'Stokes-shift-engineered' nanocrystals in a mass-polymerized PMMA matrix", Nature Photonics, vol. 8, No. 5, Apr. 13, 2014, pp. 392-399.
Mittag et al., "Triangular Ribbons for Improved Module Efficiency", 32nd European PV Solar Energy Conference and Exhibition, Jun. 20-24, 2016, Munich, Germany, 4 pgs.
Morales-Masis et al, "Transparent electrodes for efficient optoelectronics", Advanced Electronic Materials 3, No. 5 (2017): 1600529.
Myers et al., "Visual appearance of microcontacts for solar windows", Journal of Photonics for Energy, vol. 9, No. 2, May 13, 2019, 10 pgs.
Narasimhan et al., "Hybrid Metal—Semiconductor Nanostructure for Ultrahigh Optical Absorption and Low Electrical Resistance at Optoelectronic Interfaces", ACS Nano, vol. 9, No. 11, Oct. 8, 2015, pp. 10590-10597.
Needell et al., "Micro-optical Tandem Luminescent Solar Concentrators", arXiv:1710.00034v1, Sep. 5, 2017, 10 pgs.
Niu et al, "High order diffraction suppression by quasi-periodic two-dimensional gratings", Optical Materials Express, Feb. 1, 2017, vol. 7, No. 2, pp. 366-375, doi: 10.1364/OME.7.000366.
Padmanabhan et al., "Light-induced degradation and regeneration of multicrystalline silicon AI-BSF and PERC solar cells", Physica Status Solidi: Rapid Research Letters, vol. 10, No. 12, Dec. 2016, Online Publication: Nov. 16, 2016, pp. 874-881.
Papakonstantinou et al., "Fundamental limits of concentration in luminescent solar concentrators revised: the effect of reabsorption and nonunity quantum yield", Optica, vol. 2, No. 10, Oct. 2015, pp. 841-849.
Papet et al., "19% Efficiency Module Based on Roth&Rau Heterojunction Solar Cells and Day4™ Energy Module Concept", 26th European Photovoltaic Solar Energy Conference and Exhibition, Session 4AV.1.13, 2011, pp. 3336-3339.
Powell et al., "The capital intensity of photovoltaics manufacturing: barrier to scale and opportunity for innovation", Energy & Environmental Science, 2015, vol. 8, No. 12, pp. 3395-3408, doi: 10.1039/C5EE01509J.
Rahman et al., "Efficient tool flow for 3D photovoltaic modelling", Computer Physics Communications, Mar. 30, 2015, vol. 193, pp. 124-130, doi: 10.1016/j.cpc.2015.03.016.
Rau et al., "Thermodynamics of light management in photovoltaic devices", Physical Review B, vol. 90, No. 3, Jul. 15, 2014, pp. 035211-1-035211-16.
Ravikumar, "Photovoltaic Capacity Additions: The optimal rate of deployment with sensitivity to time-based GHG emissions", Masters Thesis, Dec. 2013, Arizona State University, 50 pgs.
Richards et al., "Overcoming the Poor Short Wavelength Spectral Response of CdS/CdTe Photovoltaic Modules via Luminescence Down-Shifting: Ray-Tracing Simulations", Progress in Photovoltaics, Jan. 2007, vol. 15, No. 1, pp. 27-34, published online Sep. 20, 2006, DOI: 10.1002/pip.723.
International Preliminary Report on Patentability for International Application PCT/US2019/047576, Report dated Feb. 23, 2021, dated Mar. 4, 2021, 5 Pgs.
International Preliminary Report on Patentability for International Application PCT/US2020/025834, dated Sep. 28, 2021, dated Oct. 14, 2021, 5 Pgs.

\* cited by examiner

| Metal coverage | Ave ΔR | Ave ΔA | Ave ΔT | ΔCurrent | Catalyst surface area |
|---|---|---|---|---|---|
| 10% | 0.027 | 0.005 | -0.032 | -2.7% | 56.9% |
| 25% | -0.030 | 0.012 | 0.018 | 4.9% | 142.2% |
| 50% | -0.019 | 0.031 | -0.012 | -8.9% | 284.4% |
| 83% | 0.194 | 0.098 | -0.292 | -38.5% | 472.2% |

*FIG. 7*

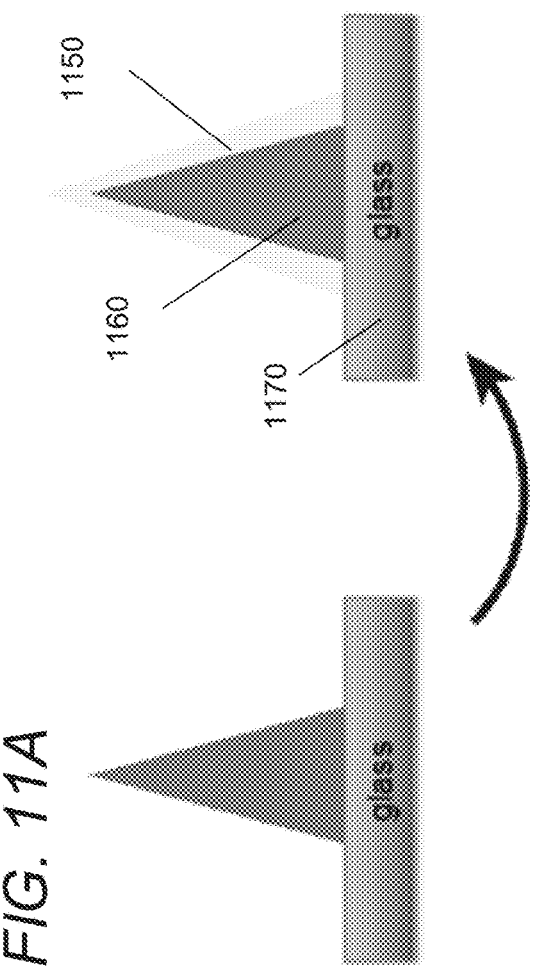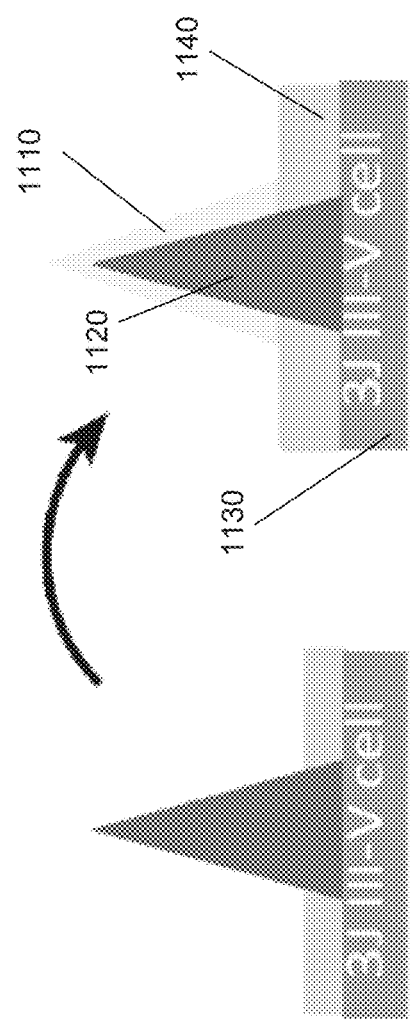
FIG. 11A
FIG. 11B

APPARATUS AND SYSTEMS FOR INCORPORATING EFFECTIVE TRANSPARENT CATALYST FOR PHOTOELECTROCHEMICAL APPLICATION

CROSS-REFERENCE TO RELATED APPLICATIONS

The current application claims the benefit of and priority under 35 U.S.C. § 119 (e) to U.S. Provisional Patent Application No. 62/826,518 entitled "Incorporating Effective Transparent Catalysts for Photoelectrochemical Application" filed Mar. 29, 2019. The disclosure of U.S. Provisional Patent Application No. 62/826,518 is hereby incorporated by reference in its entirety for all purposes.

STATEMENT OF FEDERALLY SPONSORED RESEARCH

This invention was made with government support under Grant No. EEC1041895 awarded by the National Science Foundation and under Grant No. DE-SC0004993 awarded by the DOE. The government has certain rights in the invention.

FIELD OF THE INVENTION

The present invention generally relates to apparatus and systems for photoelectrochemical cells; and more particularly to apparatus and systems that incorporate effective transparent catalyst for photoelectrochemical applications.

BACKGROUND

To achieve a sustainable future with a carbon neutral environment, solar energy is one of the most important energy sources due to the size of the resource and its wide geographical deployment potential. However, the low capacity factor for solar energy is a prominent concern that deems energy storage to be necessary. Solar fuels are promising candidates to solve the problem by direct transformation of solar energy to chemical energy. It allows terawatt-hour (TWh) range and seasonal storage with potential to outperform other storage techniques.

BRIEF SUMMARY OF THE INVENTION

Apparatus and systems in accordance with various embodiments of the invention enable the design and/or implementation of photoelectrochemical (PEC) devices. Many embodiments provide PEC devices with integrated systems for light harvesting. Several embodiments include catalytic reactions that can be leading candidates for renewable fuel generation from sunlight. Some embodiments describe light-matter interaction in the PEC system. Many embodiments describe triple-junction photocathodes that can perform carbon dioxide reduction ($CO_2R$) reactions to generate carbon monoxide (CO) and/or higher value hydrocarbon products. In several embodiments, high current density of the photocathodes can be maintained with matched spectrum. Many embodiments include triangle grid arrays can be made of effectively transparent metal catalysts. The micro-scale triangle grid arrays can create highly active and effectively transparent catalyst layers and redirect light to photoabsorbing surfaces in accordance with several embodiments. Current matching can be maintained between $CO_2R$ catalysts, oxygen evolution reaction (OER) catalysts, and PEC cells according to embodiments. Some embodiments incorporate transparent insulators to passivate photoabsorbing surfaces and reduce undesired competing reaction. Some embodiments describe electrodeposition processes to modify the surface of the metal triangle grid to increase conduction and change product distribution. By incorporating metal catalyst to catalyze $CO_2R$ reactions, the overall efficiency with which the photocathodes generate renewable fuel from sunlight can be increased.

Many embodiments describe a photoelectrochemical cell comprising a photoabsorbing surface; a plurality of three-dimensional contacts formed on the photoabsorbing surface and spaced such that a portion of the photoabsorbing surface is unoccluded thereby, and where at least one three-dimensional contact includes at least one surface that redirects radiation incident to the surface of the three-dimensional contact onto the unoccluded portion of the photoabsorbing surface, where the three-dimensional contacts comprise a metal catalyst material.

In one embodiment of the invention, the at least one three-dimensional contact has a triangular cross-section with a height substantially perpendicular to a region of the photoabsorbing surface occluded by the contact and a base substantially parallel to the occluded region.

In a further embodiment, the photoabsorbing surface is at least 10% occluded by the three-dimensional contacts.

In another embodiment, the photoabsorbing surface is about 25% to about 50% occluded by the three-dimensional contacts.

A still further embodiment includes the metal catalyst catalyzes carbon dioxide reduction reactions.

In still another embodiment, the metal catalyst comprises at least one of silver, gold, copper, and palladium.

In a yet further embodiment, the photoabsorbing surface comprises a semiconductor material.

In a further embodiment, the photoabsorbing surface comprises at least one of silicon, a tandem cell, and a triple-junction cell.

In a further embodiment again, the photoelectrochemical cell further comprising an insulating surface.

In another additional embodiment, the insulating surface passivates the unoccluded portion of the photoabsorbing surface.

In a still yet further embodiment, the photoelectrochemical cell further comprising a metal catalyst layer.

In still yet another embodiment, the metal catalyst layer is electroplated.

In a still further embodiment again, a method of fabricating a photoelectrochemical cell comprising, fabricating a master with metal grid structures; forming a polydimethylsiloxane (PDMS) stamp with the master, wherein the PDMS stamp has an inverse structure to the master; filling the PDMS stamp with metal ink; stamping the PDMS stamp onto a photoelectrochemical cell substrate to transfer the metal ink; printing the metal grid structures onto the photoelectrochemical cell substrate by removing the PDMS stamp.

In still another embodiment again, the metal ink comprises a metal catalyst.

In a still further additional embodiment, the method of fabricating a photoelectrochemical cell, further comprising electroplating a metal catalyst layer on top of the metal grid structures.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 7 illustrates the change of absorbance, reflectance, and transmittance, current of different metal catalyst triangle coverage simulations in accordance with an embodiment of the invention.

FIG. 11A-11B illustrate a metal deposition process on top of metal catalyst triangle grid arrays in accordance with an embodiment of the invention.

DETAILED DESCRIPTION OF THE INVENTION

Turning now to the drawings, PEC devices with an effective transparent catalyst in accordance with various embodiments are illustrated. Many embodiments describe triple-junction photocathodes that perform $CO_2R$ reactions to generate CO and/or higher value hydrocarbon products. Many embodiments include triangle grid arrays that can be made of effectively transparent metal catalysts. The micro-scale triangle grid arrays can create highly active and effectively transparent catalyst layers and redirect light to photoabsorbing surfaces in accordance with several embodiments. By incorporating metal catalyst to catalyze $CO_2R$ reactions, the overall efficiency with which the photocathodes generate renewable fuel from sunlight can be increased. Some embodiments describe triangle metal grids that can be made with scalable fabrication processes. Examples of fabrication processes include (but are not limited to) ink printing and electroplating. As can readily be appreciated, any of a variety of fabrication techniques can be utilized as appropriate to the requirements of specific applications in accordance with various embodiments. Several embodiments describe metal grid arrays with triangle cross-section that can reduce reflection loss. In many embodiments, transparent insulators can be incorporated onto triple-junction cells to passivate the surface and reduce undesired competing reactions. In many embodiments, mesophotonic dielectric cones can be used to guide incident light through opaque catalyst into photoabsorbing surfaces.

Photoelectrochemical (PEC) technology for the conversion of solar energy into chemicals may require cost-effective photoelectrodes to efficiently and stably drive anodic and/or cathodic half-reactions to complete the overall reactions for storing solar energy in chemical bonds. The shared properties among semiconducting photoelectrodes and photovoltaic (PV) materials are light absorption, charge separation, and charge transfer.

Figure 1:
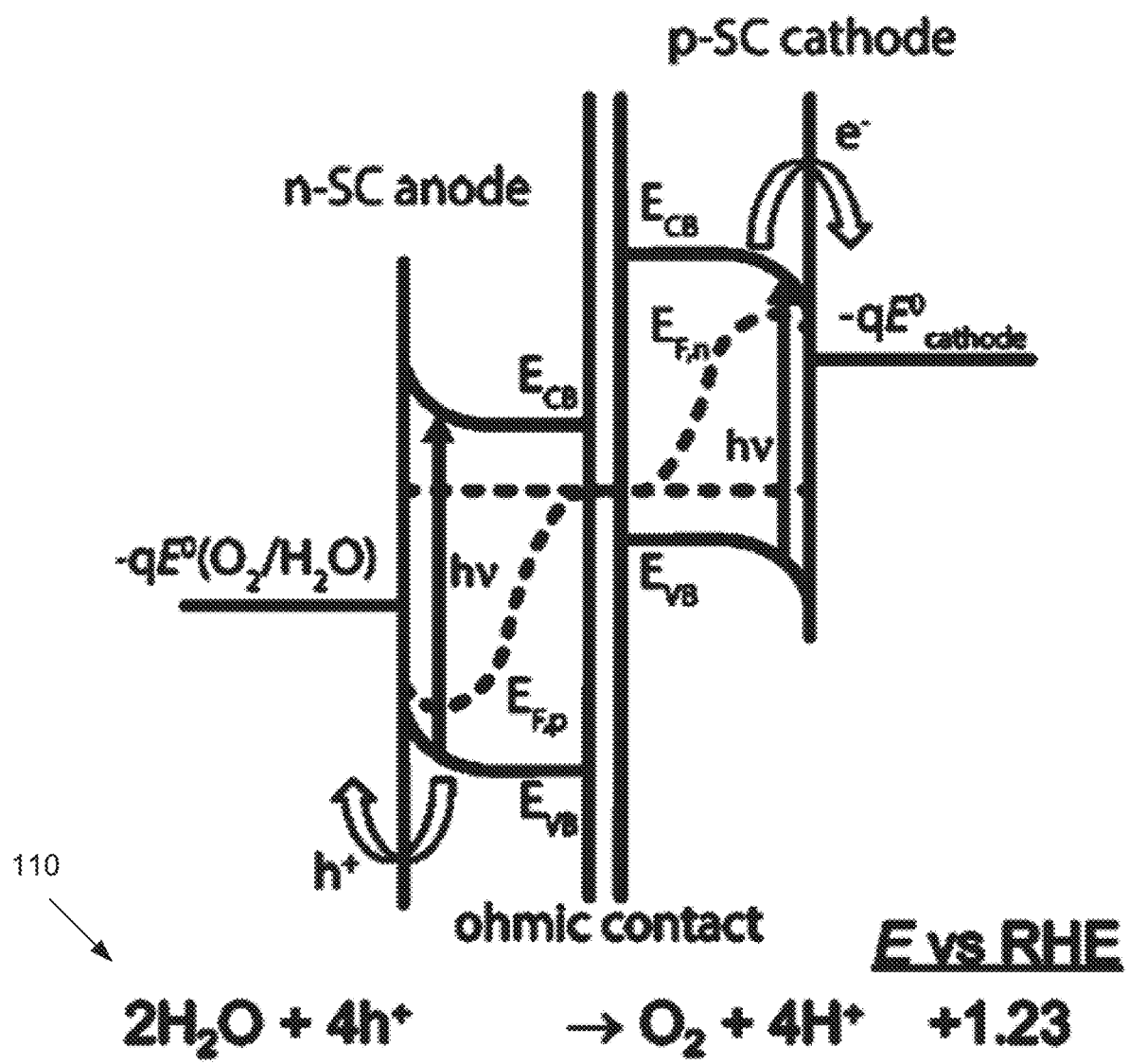
FIG. 1 illustrates an energy band alignment diagram in accordance with the prior art.

In many embodiments, direct solar-to-fuel generation using a photocathode-based PEC cell may require a light absorber. Several embodiments include light absorbers that can provide the photovoltage necessary to overcome the thermodynamic potential as well as the catalyst overpotentials for both cathode and anode reactions. FIG. 1 illustrates an energy band alignment diagram for a photoelectrochemical cell. Thermodynamic potential can be defined as the difference of anode water oxidation reaction and cathode reduction reaction. For example, the thermodynamic potential can be 1.23V for $H_2/O_2$ redox reactions as shown in 110. The thermodynamic potential can be 1.34V for $CO/O_2$ redox reactions.

Figure 2:
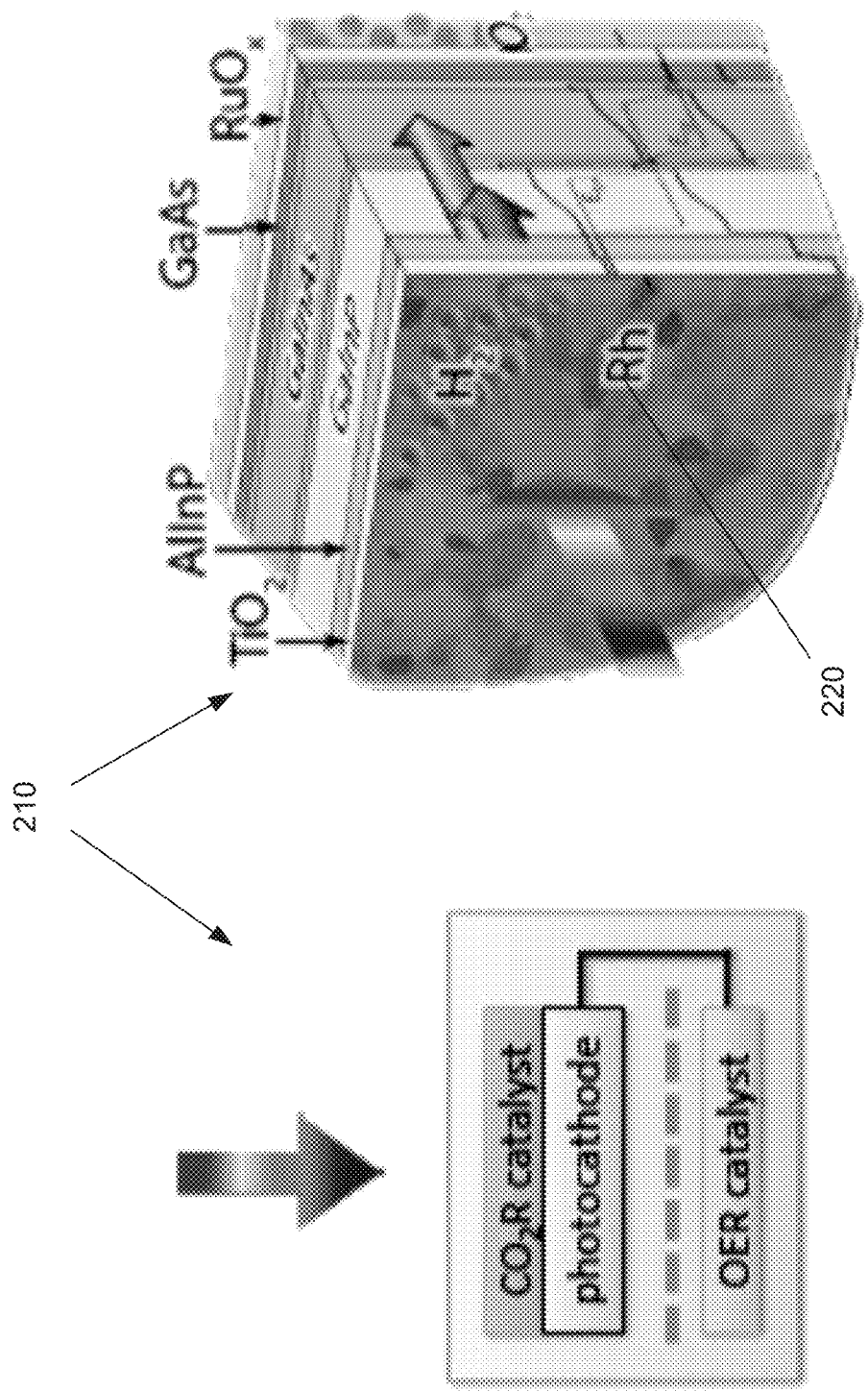
FIG. 2 illustrates a photocathode performing solar-to-hydrogen conversion in accordance with the prior art.

Many embodiments include the design and fabrication of front illuminated photocathode PECs. Several embodiments realize that to provide high solar-to-fuel efficiency embodiments maintain a catalytic current density close to the light limiting photocurrent density for a solar-driven light absorber, which can be fulfilled when catalyst ensembles are highly transparent. Some embodiments show a solar-to-hydrogen PEC conversion efficiency of about 19.3% (under simulated sunlight) in acid electrolytes. FIG. 2 illustrates a photocathode as an example of solar-to-hydrogen conversion. The photocathode 210 integrates transparent Rh nanoparticle catalysts 220 onto photocathodes with minimal parasitic absorption and reflection losses in the visible range. (See, W.-H. Cheng, et al., *ACS Energy Lett.*, 2018, 3, 8, 1795-1800; the disclosure of which is incorporated herein by reference).

In several embodiments, a different approach may be required for $CO_2$ reduction ($CO_2R$), given the opaque nature and limited activity of most $CO_2R$ catalysts. The complexity of the $CO_2R$ kinetic landscape may make it harder to control than the competing hydrogen evolution reaction (HER) at lower overpotentials. A large geometric filling fraction of opaque electrocatalysts on the electrode surface and therefore a high active catalyst area can help to enhance the catalytic activity and reduce the overpotential in accordance to some embodiments.

Previous work on silicon (Si) photocathodes describe using metal catalyst hole arrays as catalysts which block a majority of light, and that such an approach would not be applicable to tandem or triple junction solar cells since current matching between each subcell means that broadband transmission through catalyst layers is critical. (See, J. T. Song, *Adv. Energy Mater.*, 2017, 7, 3, 1601103; the disclosure of which is incorporated herein by reference). Also, earlier work with catalyst loading on high aspect ratio wire to prevent light blocking is only suitable for single junction cells and cannot be applied as a general approach. (See, Q. Kong, et al., *Nano Lett.*, 2016, 16, 9, 5675-5680; S. K. Choi, et al., *Adv. Energy Mater.*, 2014, 4, 11, 1301614; the disclosures of which are incorporated herein by reference).

Figure 3:
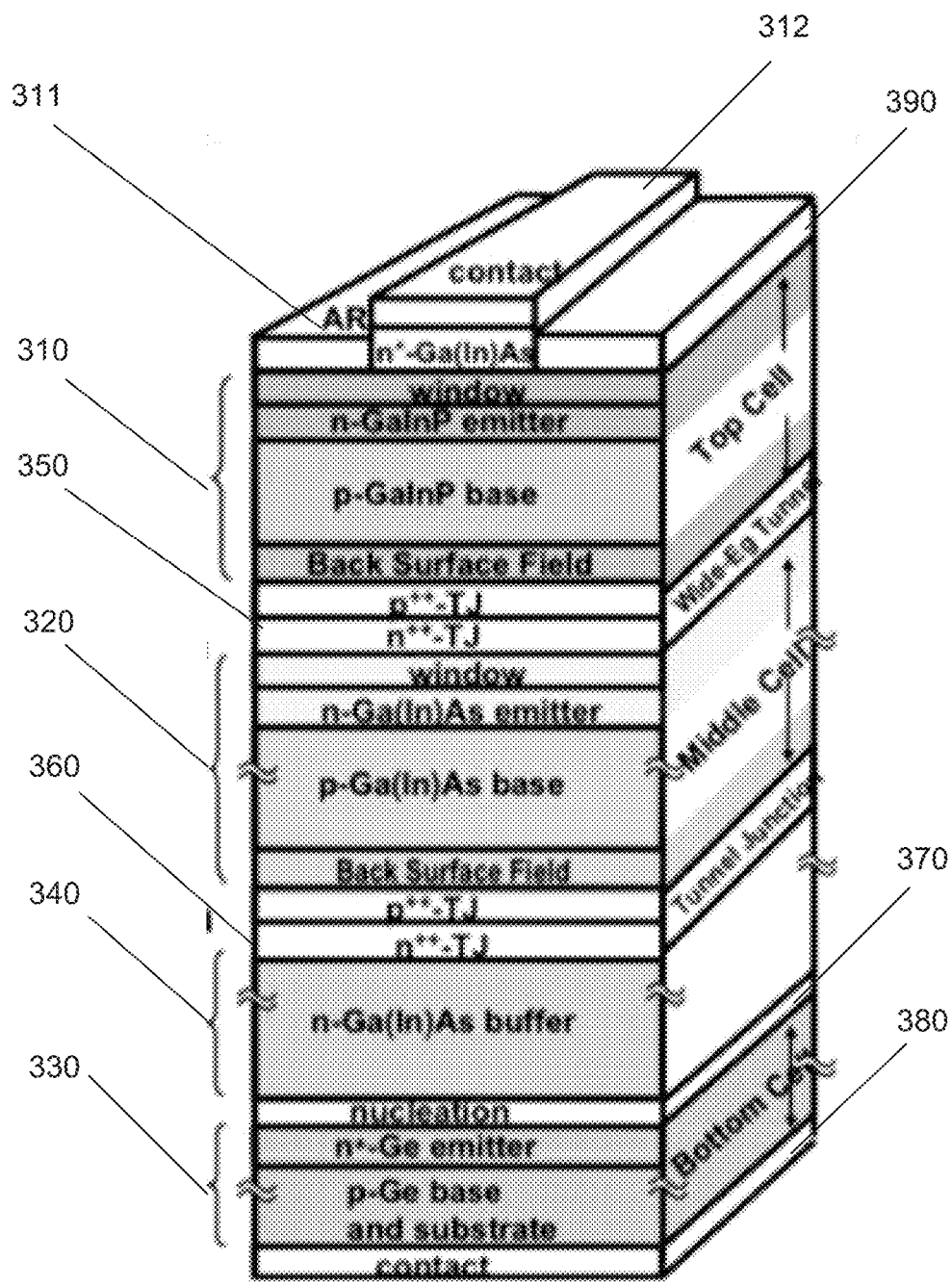
FIG. 3 illustrates a triple-junction cell structure in accordance with the prior art.

Many embodiments use highly active and effectively transparent catalyst structures for $CO_2$ reduction reactions in triple-junction photocathodes. FIG. 3 illustrates a schematic of an exemplary embodiment of such a triple-junction cell. (See, H. Cotal, et al., *Energy Environ Sci*, 2009, 2, 2, 174-192; the disclosure of which is incorporated herein by reference). As shown, in various embodiments a triple-junction cell can include a top cell 310, middle cell 320, and bottom cell 330. The top cell 310 can be a GaInP cell, including a window, an n-GaInP emitter, a p-GaInP base, and a back surface field. The middle cell 320 can be a Ga(In)As cell, including a window, an n-Ga(In)As emitter, a p-Ga(In)As base and a back surface field. The bottom cell 330 can be a Ge cell, including an $n^+$-Ge emitter, a p-Ge base and substrate. Between the middle cell and bottom cell, there can be a buffer region 340. The buffer region can be n-Ga(In)As buffer. In between the top cell and middle cell, there can be a wide-bandgap tunnel junction 350. The tunnel junction 350 can include a $p^{++}$-tunnel junction and a $n^{++}$-tunnel junction. In between the middle cell and buffer region, there can be a tunnel junction 360. The tunnel junction 360 can include a $p^{++}$-tunnel junction and a $n^{++}$-tunnel junction. In between the buffer region and the bottom cell, there can be a nucleation layer 370. Adjacent to the bottom cell 330, there can be a contact layer 380. Adjacent to the top cell 310, there can be a layer of doped semiconductor 390. The semiconductor layer 390 can be $n^+$-Ga(In)As. The semiconductor layer 390 can be coated with a layer of anti-reflective (AR) coating 311. Adjacent to the semiconductor layer 390, there can be a top contact layer 312.

Micron-Scale Triangular Metal Grid

Figure 4:
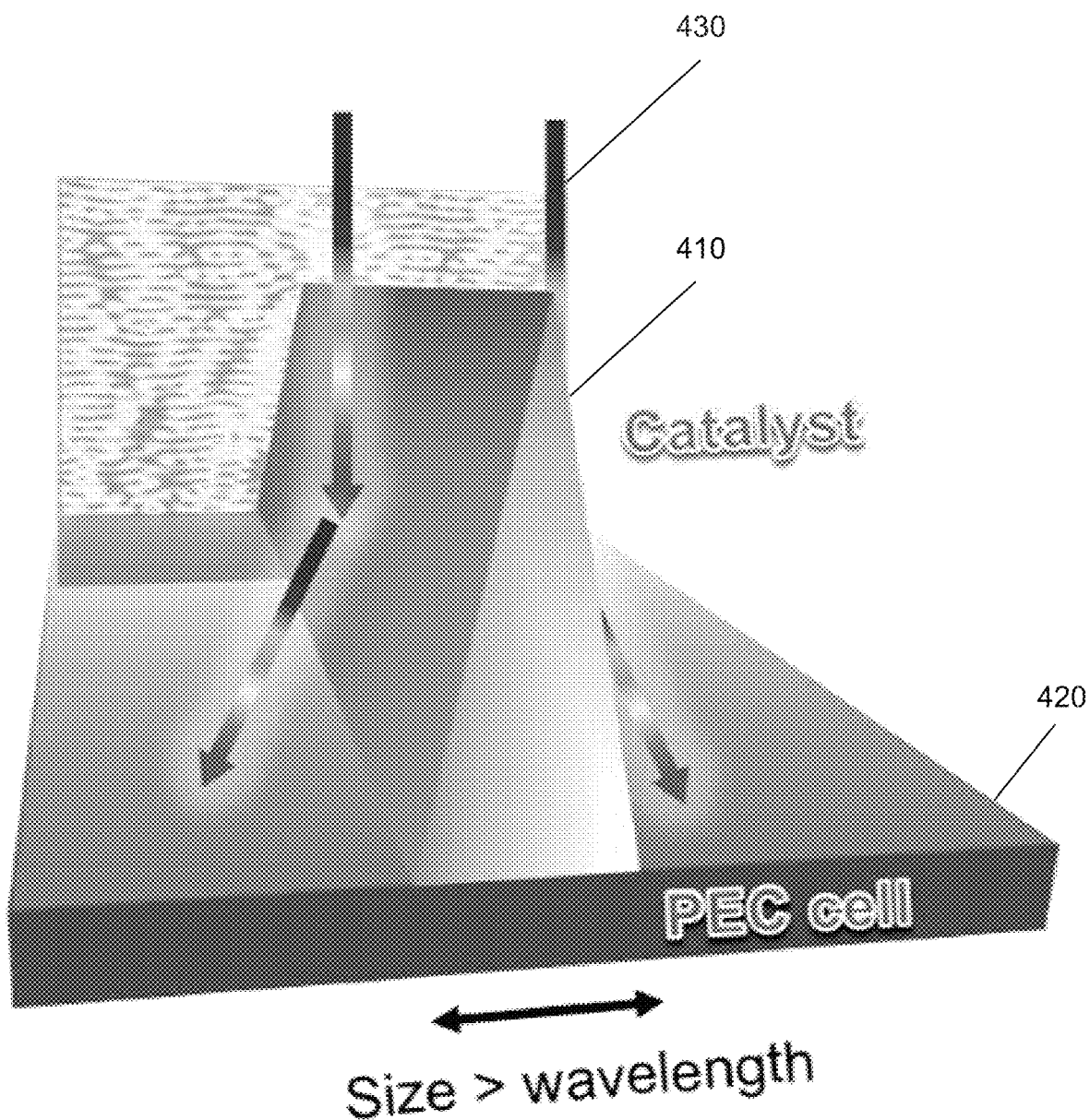
FIG. 4 illustrates a metal catalyst triangle on top of a photoelectrochemical cell in accordance with an embodiment of the invention.

Many embodiments use light management strategies to create highly active and effectively transparent catalyst structures for photocathodic $CO_2$ reduction in triple-junction photocathodes. Several embodiments include an effectively transparent catalyst consisting of arrays of micron-scale triangular cross-sectional metal grid fingers as triple-junction photocathodes. The effectively transparent catalyst is capable of redirecting the incoming light to the open areas of the PEC cell without shadow loss according to embodiments. FIG. 4 illustrates a schematic of light management implementing metal triangles 410 on top of a semiconductor photoelectrochemical cell 420 as an example of such embodiments. Broadband high transmission in the visible range 430 enables the high photocurrent. Electrons generated from the semiconductor PEC cell 420 transfer to the metal triangle 410 and initiate cathode reduction reaction. The interface between the PEC cell and the metal triangle forms an ohmic contact. Examples of the photoabsorbing PEC cell include but are not limited to silicon (Si), tandem cells, triple-junction cells. As can readily be appreciated, any of a variety of photoabsorbing materials can be utilized as appropriate to the requirements of specific applications in accordance with various embodiments. In such embodiments, the metal triangle 410 can be described as an effectively transparent catalyst. The catalyst according to such embodiments can catalyze $CO_2$ reduction reactions and generate CO and/or higher value hydrocarbon product. Examples of the catalyst include but are not limited to silver (Ag), gold (Au), copper (Cu), palladium (Pd). As can readily be appreciated, any of a variety of effectively transparent catalysts can be utilized as appropriate to the requirements of specific applications in accordance with various embodiments. Some embodiments include a metal catalyst that can be applied to different fuel products including (but not limited to) CO, formate, and higher energy density hydrocarbons. As can readily be appreciated, any of a variety of fuel production techniques can be utilized as appropriate to the requirements of specific applications in accordance with various embodiments. Examples of reactions catalyzed by metal catalysts include but are not limited to $CO_2$ reduction reaction. As can readily be appreciated, any of a variety of chemical reactions can be utilized as appropriate to the requirements of specific applications in accordance with various embodiments.

Figure 5B:
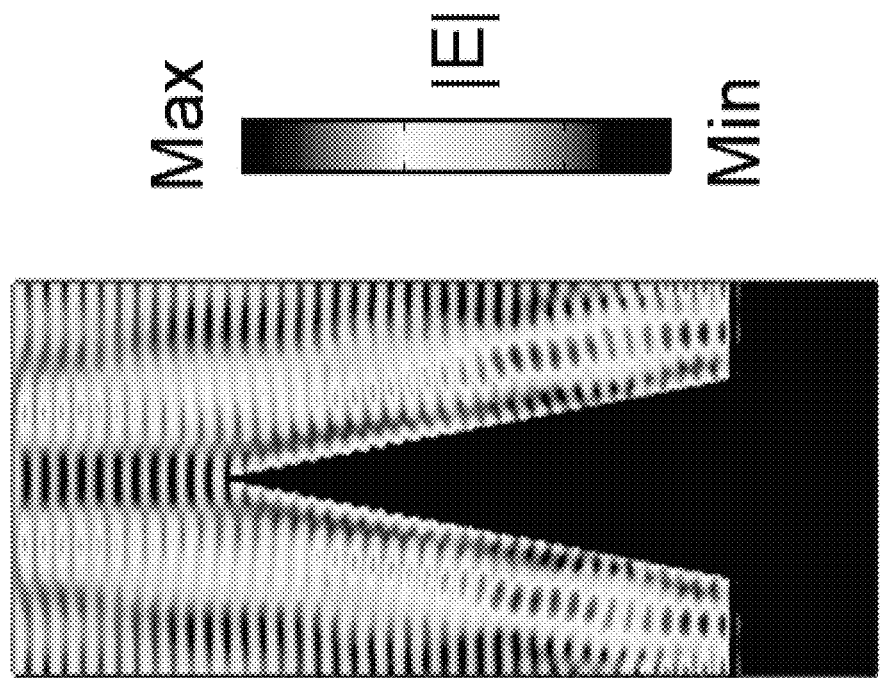
FIG. 5B illustrates a simulated field profile of a metal catalyst triangle in accordance with an embodiment of the invention.
Figure 5A:
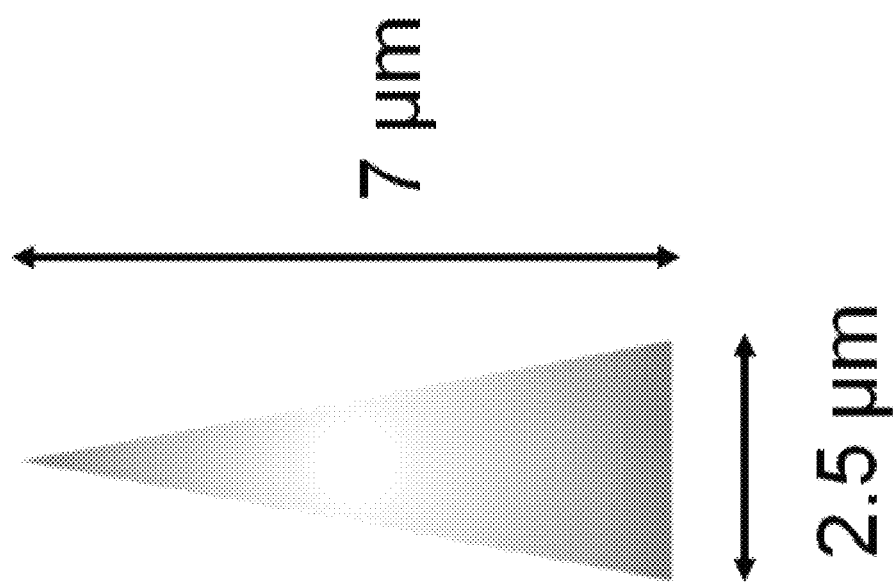
FIG. 5A illustrates an example geometry of metal catalyst triangles in accordance with an embodiment of the invention.

In some embodiments, the metal triangle catalysts are constructed to have heights that are greater than the base width of the triangles (i.e. the surface closest to the PEC surface has a width that is less than the height to which the triangle extends above the PEC surface). The base width of the triangle can be greater than the wavelength of incoming light in accordance to many embodiments. In some embodiments, the base width of the triangle can be larger than 2 μm for visible wavelength range. The base to height ratio of the triangle can range from about 1:1 ratio to about 1:3. FIG. 5A illustrates an example of triangle geometry with base width of about 2.5 μm and height of about 7 μm. As can readily be appreciated, any of a variety of triangle geometry can be utilized as appropriate to the requirements of specific applications in accordance with various embodiments. Some embodiments may use numerical calculations to investigate the electric and magnetic field distribution and optical response. FIG. 5B illustrates simulated field profile of metal catalyst triangle with 50% coverage in accordance with an embodiment of the invention. The plane wave is reflected on the slope of the metal triangle and redirected to the wave to the photoelectrochemical cell.

Figure 6A:
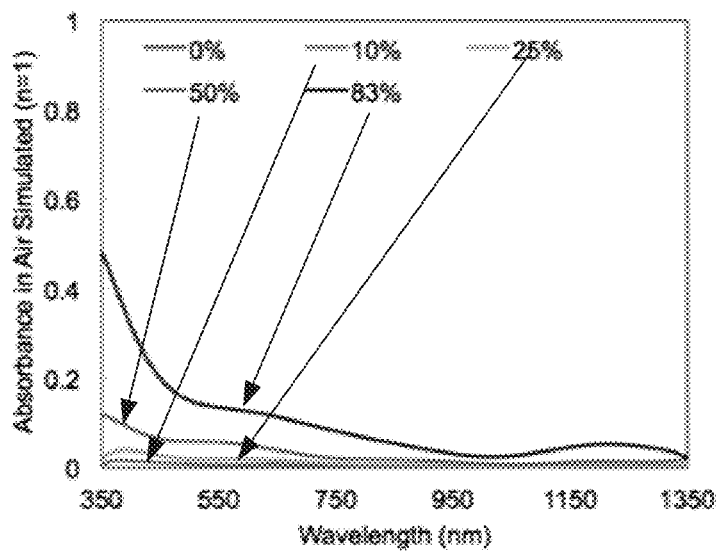
FIG. 6A-6C illustrate simulated absorption spectra, reflection spectra, and transmission spectra respectively of different metal catalyst triangle coverage in accordance with an embodiment of the invention.
Figure 6B:
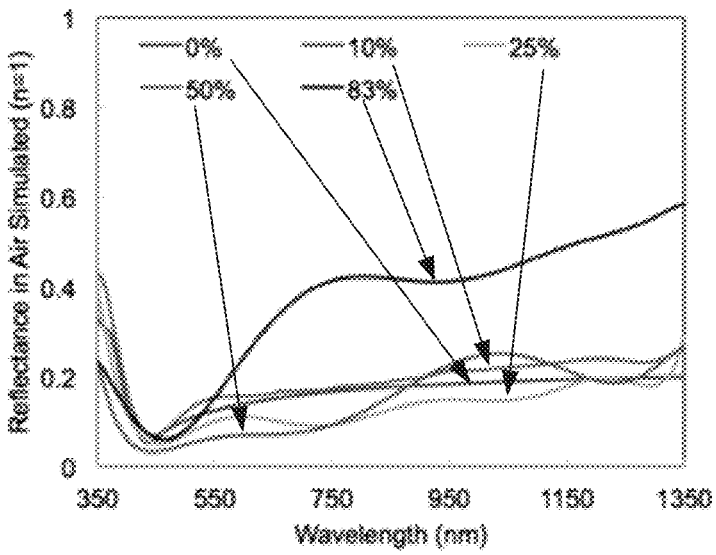
Figure 6C:
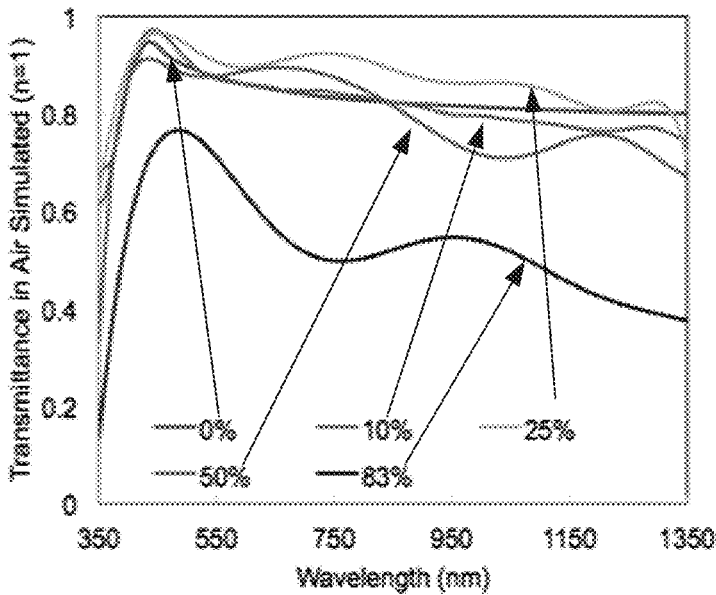

Some embodiments may use numerical calculations to determine the optimal geometry of the triangle grid array. FIG. 6A-6C illustrate the simulated absorption, reflection, transmission spectra respectively of metal catalyst triangle coverage ranging from 0%, 10%, 25%, 50% and 83% in accordance with an embodiment of the invention. The coverage can be defined as the occluded area by the metal triangle (area where the PEC cell surface is occluded by the metal triangle catalysts) to the total surface area of the photoelectrochemical cell. FIG. 7 lists the change of absorbance, reflectance, transmittance, and current of different metal catalyst triangle coverage ranging from 10%, 25%, 50%, to 83% as compared to 0% coverage in accordance with an embodiment of the invention. ΔR, ΔA, ΔT, ΔCurrent can be related to 0% metal coverage. ΔCurrent can be calculated with respect to a triple-junction cell under AM1.5 conditions. Larger geometric filling fractions of opaque electrocatalysts may be needed on the electrode surface. Hence a high active catalyst surface area may be needed to help to enhance the catalytic activity and reduce the overpotential in accordance to some embodiments. A high active catalyst surface area can be the sum of both of the metal triangle slope surface area. While attaining high catalytic current, some embodiments also describe to maintain high transmission and high photocurrent.

Figure 8:
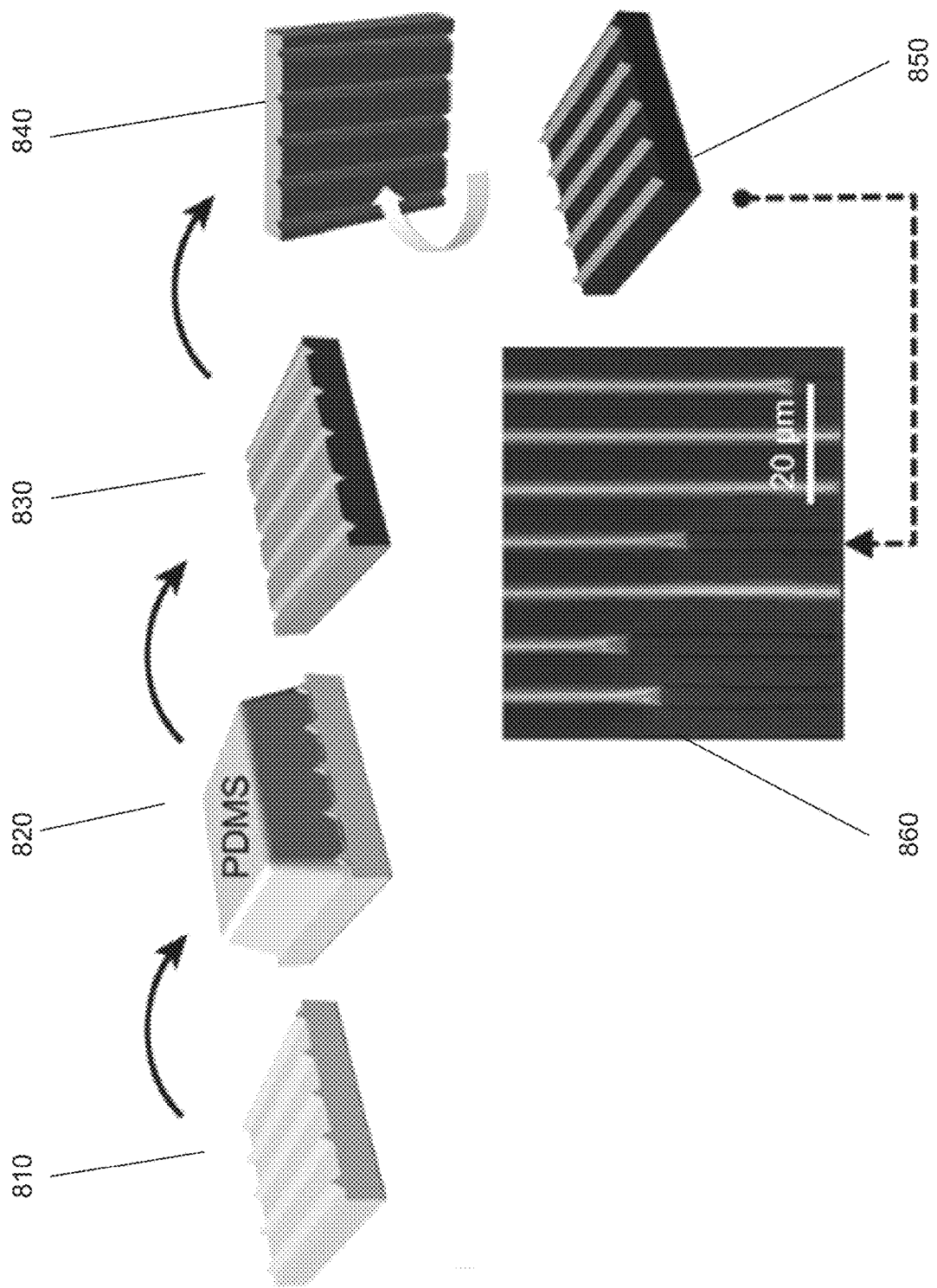
FIG. 8 illustrates a fabrication process for metal catalyst triangles in accordance with an embodiment of the invention.

Several embodiments include fabrication processes of triple junction photocathode. FIG. 8 illustrates the fabrication process of metal grids on PEC cells. First, a master is fabricated with metal grid structures using a two-photon lithography technique 810. Second, a PDMS stamp is formed with the lithography mask 820. The PDMS stamp has an inverse structure to the lithography mask 830. Next the PDMS stamp filled with metal ink 840 is stamped onto a PEC cell substrate to transfer the metal ink 840. The metal grids structures are then printed onto the PEC cell substrate after removal of the PDMS stamp 850. Scanning electron microscope (SEM) image shows the metal grids with a cross section of a triangle structure 860. In some embodiments, crossed grid structures with similar triangular cross section can also be considered.

Figure 9A:
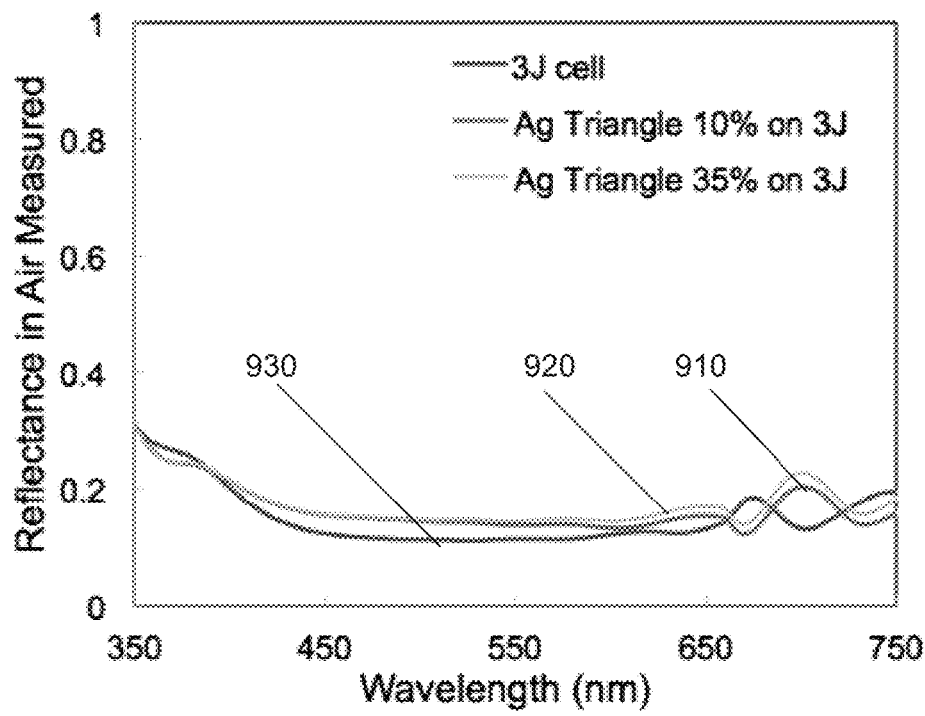
FIG. 9A-9B illustrate reflectance measurement and current density measurement of a triple-junction cell with two coverages of metal catalyst triangles in accordance with an embodiment of the invention.

Some embodiments include reflectance measurements of triple junction cells with metal catalyst arrays. FIG. 9A shows the reflectance measured in air with different wavelengths of light for two different coverage of metal catalyst grid arrays in accordance with embodiments. Both mesoscale Ag grid arrays with triangular cross-section lines and metal coverage of about 10% as illustrated in 910, and metal coverage of about 35% as illustrated in 920 can exhibit negligible additional reflection loss compared to the bare triple-junction surface 930.

Figure 9B:
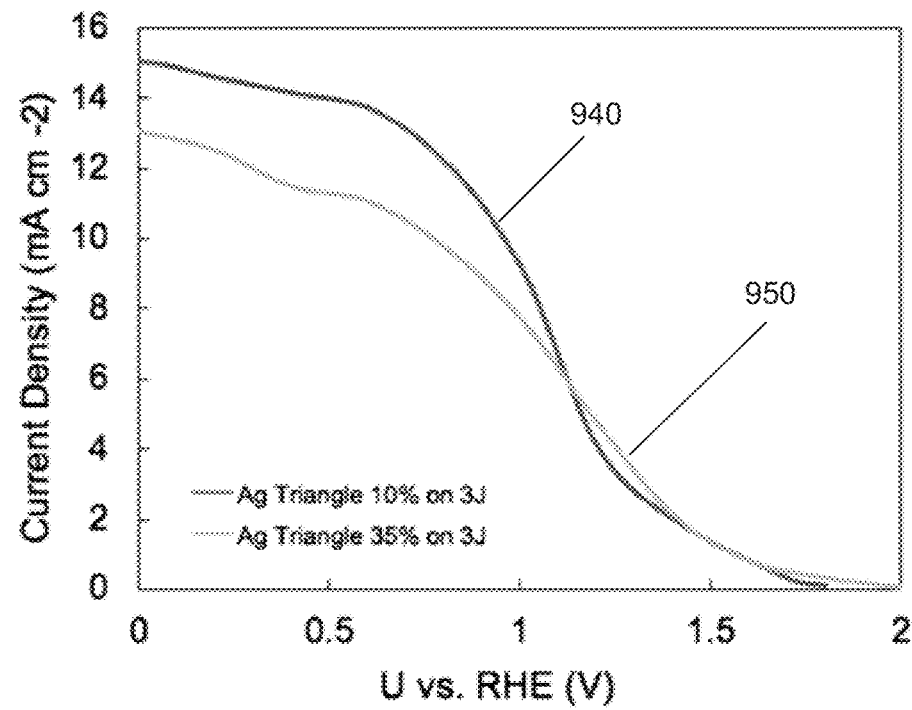

In several embodiments, current density at different potentials of triple junction photocathodes performing $CO_2R$ are included. FIG. 9B shows the current density in terms of potential (measured against reversible hydrogen electrode (RHE) potential) for two different coverages of metal catalyst grid arrays performing $CO_2R$ in 0.1 M $KHCO_3$ under 1 sun illuminations in accordance with embodiments. Mesoscale Ag grid arrays with triangular cross-section lines and metal coverage of about 10% as illustrated in 940 can have high saturation current of about 15 $mA/cm^2$. Metal coverage of about 35% as illustrated in 950 can exhibit slightly lower saturation current of about 13 $mA/cm^2$ while exhibiting better catalytic properties compared to the metal coverage of about 10% due to higher actual catalyst surface area. As can readily be appreciated from simulation results and experimental demonstration, metal catalyst grids with coverage ranging from 25% to 50% can be utilized as appropriate to the requirements of specific applications in accordance with various embodiments.

Micron-Scale Triangular Metal Grid with Insulator Passivation

Many embodiments incorporate an insulating layer between the metal catalyst grids on top of the PEC cell substrates to create highly active and effectively transparent catalyst structures for photocathodic $CO_2$ reduction. Several embodiments include an effectively transparent catalyst consisting of arrays of micron-scale triangular cross-sectional metal grid fingers. The effectively transparent catalyst is capable of redirecting the incoming light to the open areas of the PEC cell without shadow loss according to embodiments. Some embodiments incorporate an insulating layer on the PEC cell substrate to passivate the surface and reduce competing reactions of $CO_2R$ reactions on the surface, hence improving the solar-to-fuel conversion efficiency.

Figure 10A:
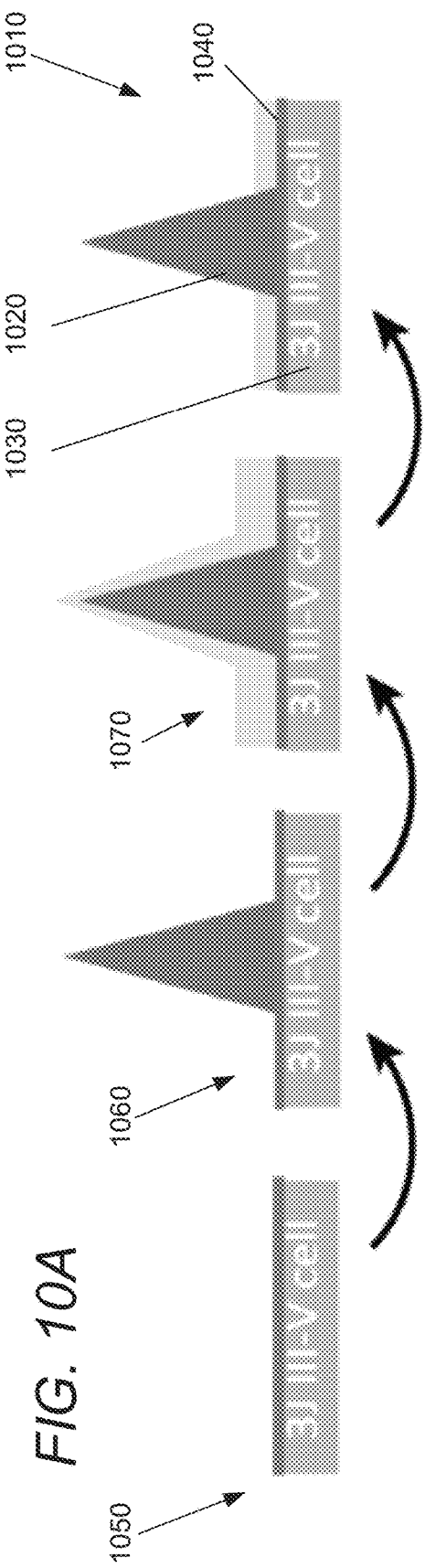
FIG. 10A-10D illustrate metal catalyst triangle grid arrays with insulator passivation on the photoabsorbing surface in accordance with an embodiment of the invention.
Figure 10D:
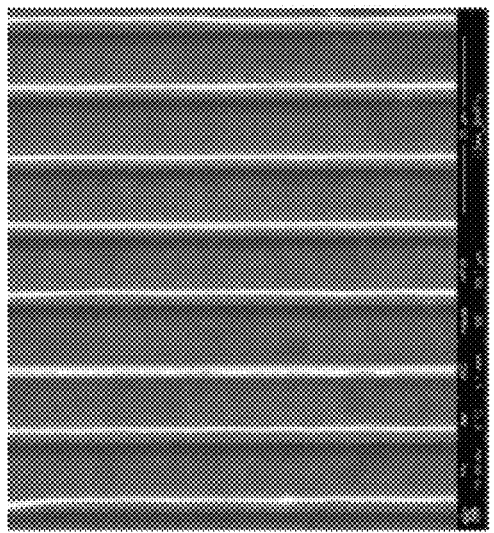
Figure 10C:
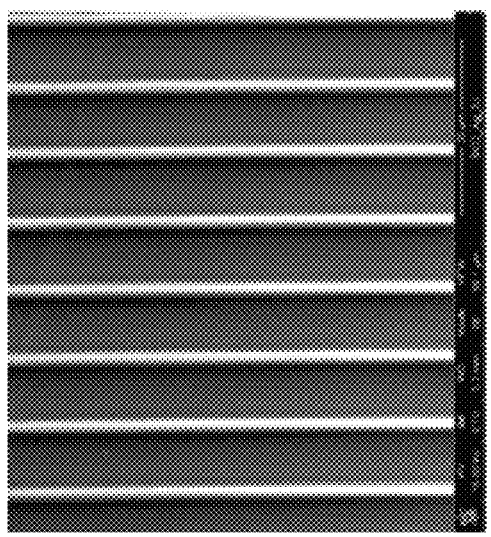
Figure 10B:
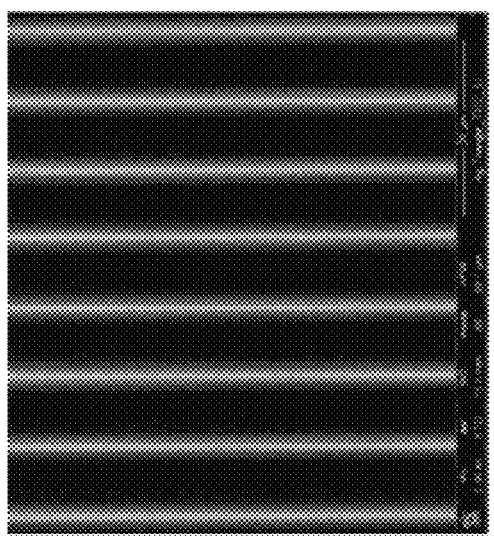

FIG. 10A illustrates a fabrication process for the PEC photocathode with an insulating layer as an example of such embodiments. In some embodiments, an interfacial layer can be applied to improve adhesion of metal catalysts and electrical conduction to the bottom photoelectrochemical cell. Examples of the interfacial layer include but are not limited to nickel (Ni), titanium (Ti), chromium (Cr). As can readily be appreciated, any of a variety of interfacial layers can be utilized as appropriate to the requirements of specific applications in accordance with various embodiments. First, the interfacial layer is deposited on top of the triple-junction photocathode PEC cell as shown in 1050. Second, the triangle metal catalyst grid arrays are printed on top of the interfacial layer 1060. FIG. 10B shows an SEM image of printed Ag catalyst grid arrays on PEC cells. Third, a layer of transparent insulator is evaporated on top of the metal arrays 1070. FIG. 10C shows an SEM image of a layer of silicon oxide evaporated onto the Ag grid arrays using electron beam evaporation (E-beam) technique. Lastly, a chemical etch is used to remove the insulating layers on top of the triangle structures, but keep the insulating layers on the PEC cells 1010. FIG. 10D shows an SEM image of etching the silicon oxide layer with buffered hydrofluoric acid (BHF) for about 1 second.

A schematic of a micron-scale triangular metal grid with insulator passivation is illustrated in 1010 of FIG. 10A. Light management with a metal triangle 1020 is on top of a semiconductor photoelectrochemical cell 1030 with a transparent insulating layer 1040. The insulating layer 1040 covers the PEC cell surface that is not in contact with the metal triangle catalyst. The coverage of insulating layer on triple junction cells can passivate the surface and reduce undesired competing reactions, such as hydrogen evolution reactions (HER), on the PEC cells. Broadband high transmission in the visible range can enable a high photocurrent. Elimination of competing HERs can enhance the $CO_2R$ reactions efficiency. The metal triangle 1020 can be described as an effectively transparent catalyst. The catalyst can catalyze $CO_2$ reduction reactions and generate CO and/or higher value hydrocarbon products. Other chemical reactions can also be achieved utilizing different metal catalysts. Examples of the catalysts include but are not limited to silver (Ag), gold (Au), copper (Cu), palladium (Pd). As can readily be appreciated, any of a variety of effectively transparent catalysts can be utilized as appropriate to the requirements of specific applications in accordance with various embodiments.

In some embodiments, the metal triangle catalysts are constructed to have heights that are greater than the base width of the triangles (i.e. the surface closest to the PEC surface has a width that is less than the height to which the triangle extends above the PEC surface). The base width of the triangle can be greater than the wavelength of incoming light in accordance to many embodiments. In some embodiments, the base width can be larger than about 2 μm for visible wavelength range. The base to height ratio of the triangle can range from about 1:1 to about 1:3. Some embodiments include a metal catalyst that can be applied to different fuel production including (but are not limited to) CO, formate, and higher energy density hydrocarbon. As can readily be appreciated, any of a variety of fuel production can be utilized as appropriate to the requirements of specific applications in accordance with various embodiments. Electrons generated from the semiconductor PEC cell 1030 transfer to the metal triangle 1020 then perform cathode reduction reaction, forming an ohmic contact. Examples of the photoabsorbing PEC cell include but are not limited to silicon (Si), tandem cells, triple-junction cells. As can readily be appreciated, any of a variety of photoabsorbing material can be utilized as appropriate to the requirements of specific applications in accordance with various embodiments. The transparent insulating layer 1040 passivates the triple-junction photocathode surfaces. Examples of the transparent insulating layer include (but are not limited to) silicon oxide ($SiO_2$), aluminum oxide ($Al_2O_3$). As can readily be appreciated, any of a variety of transparent insulating material can be utilized as appropriate to the requirements of specific applications in accordance with various embodiments.

Several embodiments include additional metal electrodeposition on the triple junction photocathode and/or insulating substrate. FIG. 11A illustrates that metal triangular grids can be printed directly on an insulating substrate. In some embodiments, the insulating substrate 1170 can be made of (but not limited to) silicon oxide ($SiO_2$), aluminum oxide ($Al_2O_3$). Metal ions in the electrolyte can be electroplated on the metal triangle 1160 to form the additional metal catalyst layer 1150.

FIG. 11B illustrates an additional layer of metal deposited on top of metal catalyst triangle grid arrays in accordance with an embodiment of the invention. Electrons transfer from the semiconductor PEC cell 1130 to the metal triangle 1120 but not the transparent insulating layer 1140. Then metal ions in the electrolyte can be electroplated on the metal triangle to form the additional metal catalyst layer 1110.

Figure 12C:
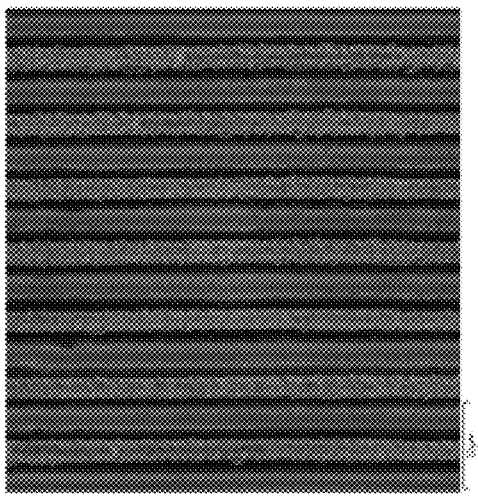
FIG. 12A-12D illustrate elementary mapping of two types of metal catalyst triangle grid arrays in accordance with an embodiment of the invention.
Figure 12D:
Figure 12A:
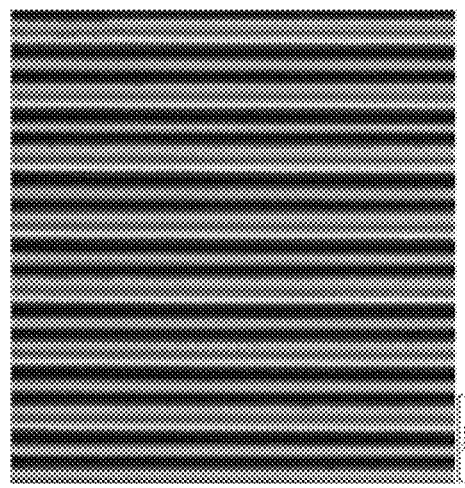
Figure 12B:
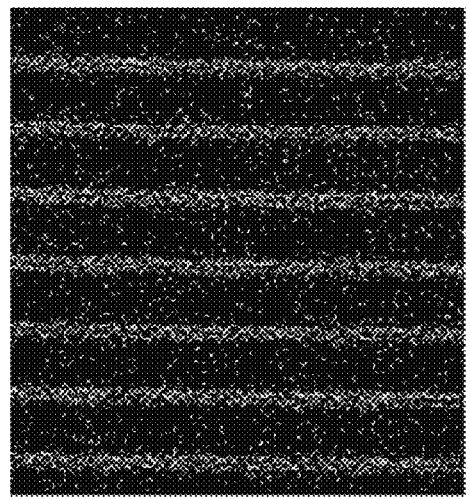

Several embodiments including combinations of metal catalysts can be used for metal grid arrays. In some embodiments, a layer of different metal catalyst can be electroplated on top of the metal catalyst grid array. FIG. 12A shows an SEM image of printed Ag catalyst grid arrays. FIG. 12B shows EDX (Energy-dispersive X-ray spectroscopy) elementary mapping of the corresponding printed Ag catalyst grid arrays, indicating the distribution of Ag. FIG. 12C shows an SEM image of a layer of Cu electroplated onto the Ag grid arrays. FIG. 12D shows EDX elementary mapping of the corresponding Ag grid arrays. Examples of the catalysts include but are not limited to silver (Ag), gold (Au), copper (Cu), palladium (Pd). As can readily be appreciated, any of a variety of effectively transparent catalysts can be utilized as appropriate to the requirements of specific applications in accordance with various embodiments.

Figure 13A:
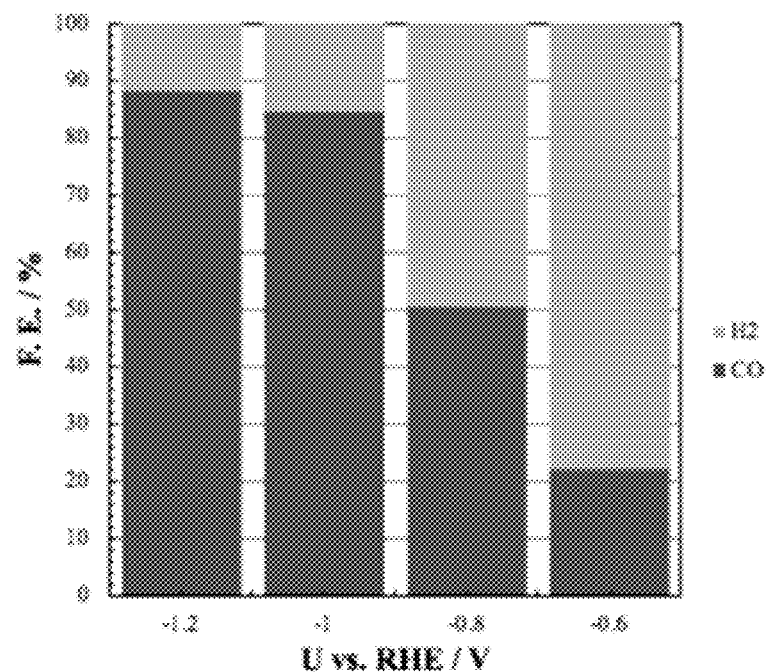
FIG. 13A-13B illustrate product distribution of different types of metal catalyst triangle grid arrays in accordance with an embodiment of the invention.
Figure 13B:
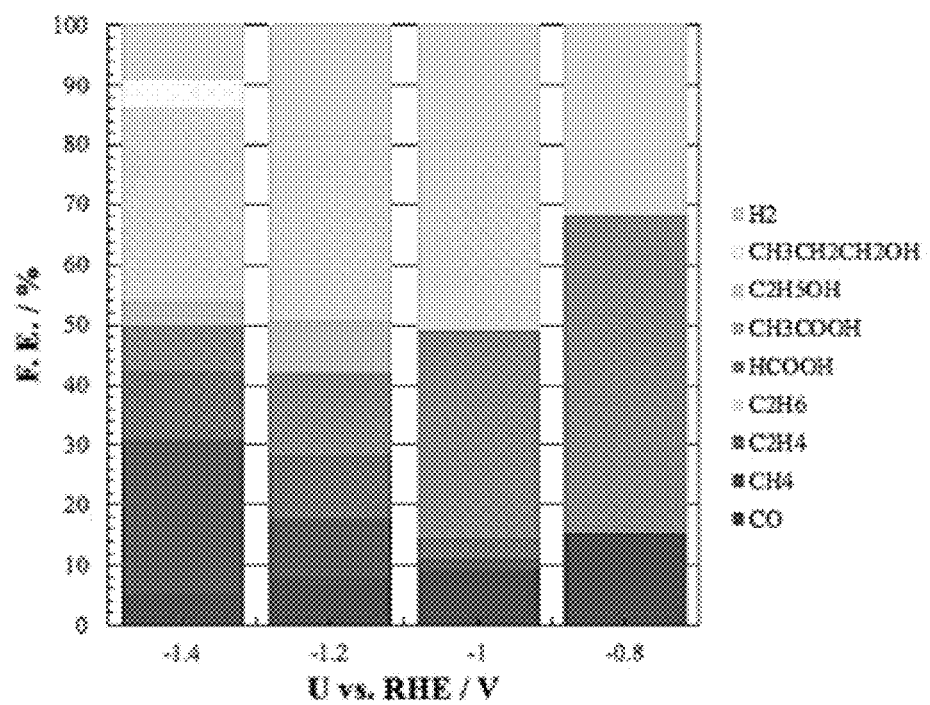

In several embodiments, the catalyst can catalyze $CO_2$ reduction reactions and generate CO and/or higher value hydrocarbon product. Other chemical reaction can also be achieved utilizing other metal catalysts. FIG. 13A illustrates the product distribution of printed Ag catalyst triangle grid arrays in terms of potential (measured against reversible hydrogen electrode (RHE) potential) in accordance with an embodiment of the invention. FIG. 13B shows the product distribution of additional Cu electrodeposited on Ag catalyst triangle grid arrays in terms of potential (measured against reversible hydrogen electrode (RHE) potential). While the Ag catalysts show optimized faraday efficiency near 90% for CO at −1.2V vs RHE, other higher value hydrocarbon products including ethylene and ethanol can be generated with additional Cu electrodeposited catalyst layer.

Although specific apparatus and systems for incorporating effectively transparent catalyst for PEC applications are discussed above, many different designs can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A photoelectrochemical cell, comprising:
a photoabsorbing surface; and
a plurality of three-dimensional contacts formed on the photoabsorbing surface and spaced such that a portion of the photoabsorbing surface is unoccluded thereby, and where at least one of the plurality of three-dimensional contacts includes at least one surface that redirects radiation incident to the at least one surface of the three-dimensional contact onto the unoccluded portion of the photoabsorbing surface;
wherein the plurality of three-dimensional contacts comprises a metal catalyst material;
wherein each of the plurality of three-dimensional contacts comprises a triangular bar and each triangular bar has a base parallel to the photoabsorbing surface and each base has a width greater than a wavelength of an incoming light;
wherein a first side and a second side of the triangular bar protrude outward from the photoabsorbing surface and converge at a line; and
wherein any of a cross-section of each triangular bar of that is perpendicular to the base and intercepts the first and second sides of the triangular bar has a triangular shape.

2. The photoelectrochemical cell of claim 1, wherein the photoabsorbing surface is at least 10% occluded by the plurality of three-dimensional contacts.

3. The photoelectrochemical cell of claim 1, wherein the photoabsorbing surface is 25% to 50% occluded by the plurality of three-dimensional contacts.

4. The photoelectrochemical cell of claim 1, wherein the metal catalyst material catalyzes at least one carbon dioxide reduction reaction.

5. The photoelectrochemical cell of claim 1, wherein the metal catalyst material comprises at least one of silver, gold, copper, and palladium.

6. The photoelectrochemical cell of claim 1, wherein the photoabsorbing surface comprises a semiconductor material.

7. The photoelectrochemical cell of claim 1, wherein the photoabsorbing surface comprises at least one of silicon, a tandem cell, and a triple-junction cell.

8. The photoelectrochemical cell of claim 1, further comprising an insulating surface.

9. The photoelectrochemical cell of claim 8, wherein the insulating surface passivates the unoccluded portion of the photoabsorbing surface.

10. The photoelectrochemical cell of claim 1, further comprising a metal catalyst layer.

11. The photoelectrochemical cell of claim 10, wherein the metal catalyst layer is electroplated.

* * * * *